(12) United States Patent
Whittemore

(10) Patent No.: US 10,961,730 B2
(45) Date of Patent: Mar. 30, 2021

(54) MOUNTING UNIT FOR PARTITION MOUNT

(71) Applicant: Zipwall, LLC, Arlington, MA (US)

(72) Inventor: Jeffrey P. Whittemore, Arlington, MA (US)

(73) Assignee: Zipwall, LLC, Arlington, MA (US)

( * ) Notice: Subject to any disclaimer, the term of this patent is extended or adjusted under 35 U.S.C. 154(b) by 6 days.

(21) Appl. No.: 16/575,730

(22) Filed: Sep. 19, 2019

(65) Prior Publication Data

US 2020/0080685 A1 Mar. 12, 2020

Related U.S. Application Data

(63) Continuation of application No. 15/170,155, filed on Jun. 1, 2016, now Pat. No. 10,428,539.

(Continued)

(51) Int. Cl.
*E04G 21/24* (2006.01)
*F16B 2/06* (2006.01)
(Continued)

(52) U.S. Cl.
CPC ........... *E04G 21/243* (2013.01); *E04G 21/24* (2013.01); *E04G 21/245* (2013.01); *E04G 21/247* (2013.01); *E04G 21/26* (2013.01); *E04G 21/30* (2013.01); *F16B 2/005* (2013.01); *F16B 2/06* (2013.01); *F16M 13/022* (2013.01); *E04G 2025/006* (2013.01); *F16M 13/027* (2013.01)

(58) Field of Classification Search
CPC ..... E04G 21/243; E04G 21/24; E04G 21/245; E04G 21/247; E04G 21/26; E04G 21/30; E04G 2025/006; F16B 2/005; F16B 2/06; F16M 13/022
See application file for complete search history.

(56) References Cited

U.S. PATENT DOCUMENTS 642,236 A * 1/1900 Larimer ............... A47C 21/022
                                                24/3.12
827,000 A * 7/1906 Dinsmore ................. E06B 9/78
                                                160/384

(Continued)

FOREIGN PATENT DOCUMENTS

DE     3918516      6/1989
DE     4420849      12/1995

(Continued)

OTHER PUBLICATIONS

"Curtain-Wall", Brochure by Curtain-Wall.com, Feb. 2000.

(Continued)

*Primary Examiner* — Eret C McNichols
(74) *Attorney, Agent, or Firm* — Onello & Mello, LLP

(57) ABSTRACT

A mounting unit of a partition mount system that removably secures a sheet of material includes a first portion and a second portion. The first portion has a first end and a second end opposite the first end and a pivot on a lower surface thereof. The second portion has a first end and a second end opposite the first end and is configured to mate with the first portion. The first end of the second portion is wider than the second end of the second portion. The first portion and second portion are configured to secure a sheet of material therebetween.

16 Claims, 18 Drawing Sheets

Related U.S. Application Data

(60) Provisional application No. 62/170,308, filed on Jun. 3, 2015.

(51) Int. Cl.
  *F16B 2/00* (2006.01)
  *E04G 21/26* (2006.01)
  *E04G 21/30* (2006.01)
  *F16M 13/02* (2006.01)
  *E04G 25/00* (2006.01)

(56) References Cited

U.S. PATENT DOCUMENTS

| | | | | |
|---|---|---|---|---|
| 1,705,625 A * | 3/1929 | Mitchell | ............... | F16B 7/10 403/63 |
| 1,766,324 A * | 6/1930 | Berner | ............... | E21F 17/103 454/170 |
| 2,219,169 A * | 10/1940 | Alter | ............... | B60R 11/04 248/694 |
| 2,232,194 A * | 2/1941 | Zogby | ............... | A47K 3/38 160/349.1 |
| 2,474,158 A * | 6/1949 | Neely | ............... | A47C 7/30 160/387 |
| 2,487,585 A * | 11/1949 | Pencek | ............... | H02G 11/003 248/51 |
| 2,816,769 A * | 12/1957 | Noble | ............... | B23Q 1/703 279/83 |
| 2,903,227 A * | 9/1959 | De Kalb | ............... | A47F 5/06 248/200.1 |
| 2,942,829 A * | 6/1960 | Stiffel | ............... | F21V 21/06 248/188.3 |
| 3,072,784 A * | 1/1963 | Mann | ............... | F21V 21/13 362/223 |
| 3,090,826 A * | 5/1963 | Cochran | ............... | F16B 21/02 174/158 R |
| 3,118,363 A * | 1/1964 | Burgess, Jr. | ............... | E21F 1/14 454/170 |
| 3,247,558 A * | 4/1966 | Kaufman | ............... | G03B 21/328 24/457 |
| 3,322,381 A * | 5/1967 | Bubb | ............... | G09F 1/10 248/121 |
| 3,327,310 A * | 6/1967 | Bethune | ............... | H01Q 1/1235 343/702 |
| 3,333,808 A * | 8/1967 | Du Boff | ............... | E04G 25/04 248/200.1 |
| 3,350,120 A * | 10/1967 | Hinrichs | ............... | E04G 25/04 403/109.3 |
| 3,433,510 A * | 3/1969 | Hulterstrum | ............... | F16C 11/10 403/77 |
| 3,529,860 A * | 9/1970 | Jelley | ............... | F16B 21/09 160/402 |
| 3,592,434 A * | 7/1971 | Murray | ............... | G03B 21/58 248/685 |
| 3,604,397 A * | 9/1971 | Salerno | ............... | A01K 15/024 119/706 |
| 3,608,991 A * | 9/1971 | Wade | ............... | A47B 69/00 312/107 |
| 3,713,643 A * | 1/1973 | Gerstenberger | ............... | D06F 89/005 493/405 |
| 3,767,253 A * | 10/1973 | Kluetsch | ............... | B60P 7/14 410/118 |
| 3,792,510 A * | 2/1974 | Evett | ............... | E04G 21/28 24/459 |
| 3,822,850 A * | 7/1974 | Elias | ............... | E04G 21/3233 248/551 |
| 3,858,988 A * | 1/1975 | Cohen | ............... | F16B 7/22 403/18 |
| 3,861,663 A * | 1/1975 | Strickland | ............... | A41H 43/005 269/26 |
| 3,863,554 A * | 2/1975 | Boyd | ............... | E21F 1/14 454/170 |
| 3,952,877 A * | 4/1976 | Kindl | ............... | A47H 1/022 211/105.5 |
| 3,956,784 A * | 5/1976 | Vargas | ............... | A47C 29/003 135/96 |
| 3,972,272 A * | 8/1976 | Bagby | ............... | E21F 17/103 454/169 |
| 3,994,463 A * | 11/1976 | Baker | ............... | A47H 1/142 248/265 |
| 4,077,083 A * | 3/1978 | Siemund | ............... | A47L 13/257 15/244.1 |
| 4,078,756 A * | 3/1978 | Cross | ............... | F16M 11/06 248/231.71 |
| 4,087,006 A * | 5/1978 | Schill | ............... | A47K 3/001 211/105.6 |
| 4,111,217 A * | 9/1978 | Victor | ............... | E04H 15/60 135/114 |
| 4,127,911 A * | 12/1978 | Cupp | ............... | B05C 17/00 15/144.1 |
| 4,139,101 A * | 2/1979 | Towfigh | ............... | A47G 5/00 160/336 |
| 4,277,863 A * | 7/1981 | Faneuf | ............... | A44B 99/00 224/247 |
| 4,379,654 A * | 4/1983 | Rovelli | ............... | E21D 11/381 405/53 |
| 4,396,325 A * | 8/1983 | Joice-Cavanagh | ............... | B60P 7/14 410/118 |
| 4,488,651 A * | 12/1984 | Bishop | ............... | A47K 3/38 211/105.6 |
| 4,502,256 A * | 3/1985 | Hahn | ............... | E04D 5/143 24/459 |
| 4,536,924 A * | 8/1985 | Willoughby | ............... | A44B 99/00 24/487 |
| 4,576,354 A * | 3/1986 | Blessing, Sr. | ............... | E04F 21/1805 182/186.6 |
| 4,586,844 A * | 5/1986 | Hammonds | ............... | E04G 7/20 182/178.3 |
| 4,592,797 A * | 6/1986 | Carlson | ............... | B44C 7/06 15/235.4 |
| 4,645,473 A * | 2/1987 | Mochizuki | ............... | F16D 1/05 464/79 |
| 4,662,034 A * | 5/1987 | Cunningham | ............... | A44B 1/28 24/108 |
| 4,708,189 A * | 11/1987 | Ward | ............... | E04G 21/243 160/351 |
| 4,715,089 A * | 12/1987 | Schema | ............... | B25G 1/04 16/429 |
| 4,717,107 A * | 1/1988 | Servadio | ............... | D06F 53/04 24/132 R |
| 4,770,086 A * | 9/1988 | Gabster | ............... | E21F 1/14 160/350 |
| 4,794,974 A * | 1/1989 | Melino | ............... | A47H 21/00 160/327 |
| 4,824,302 A * | 4/1989 | Schultheis | ............... | B60P 7/15 211/105.3 |
| 4,852,844 A * | 8/1989 | Villaveces | ............... | A61M 25/02 248/314 |
| 4,874,028 A * | 10/1989 | Lynch | ............... | A47H 99/00 160/332 |
| 4,885,876 A * | 12/1989 | Henke | ............... | B24D 15/04 451/503 |
| 4,907,835 A * | 3/1990 | Salters | ............... | B60N 2/787 296/1.09 |
| 4,912,814 A * | 4/1990 | McKenzie | ............... | A41D 25/022 24/115 H |
| 4,926,522 A * | 5/1990 | Wang | ............... | B25F 1/02 15/144.1 |
| 4,928,916 A * | 5/1990 | Molloy | ............... | E04F 21/1805 248/354.1 |
| 4,949,523 A * | 8/1990 | Kassem | ............... | E04D 5/143 24/462 |
| 4,969,241 A * | 11/1990 | Griffin | ............... | A44B 1/14 24/113 MP |
| 5,038,889 A * | 8/1991 | Jankowski | ............... | E04G 5/12 182/129 |
| 5,040,915 A * | 8/1991 | Stuart | ............... | B23K 9/287 403/146 |

(56) References Cited

U.S. PATENT DOCUMENTS

| | | | | |
|---|---|---|---|---|
| 5,056,753 A * | 10/1991 | Lunau | A47K 17/02 | 248/200.1 |
| 5,078,348 A * | 1/1992 | Babitchenko | F16M 11/046 | 211/196 |
| 5,116,012 A * | 5/1992 | Offenhauer | A47B 97/02 | 211/45 |
| 5,129,774 A * | 7/1992 | Balseiro | E04F 21/1805 | 248/354.1 |
| 5,131,781 A * | 7/1992 | Klein | A47B 57/50 | 403/254 |
| 5,170,974 A * | 12/1992 | Ruggiero | A47K 3/38 | 160/124 |
| 5,240,058 A * | 8/1993 | Ward | E04B 9/34 | 160/123 |
| 5,287,614 A * | 2/1994 | Ehrlich | A47G 11/006 | 150/158 |
| 5,299,773 A * | 4/1994 | Bertrand | B63B 45/00 | 248/292.12 |
| 5,301,915 A * | 4/1994 | Bahniuk | A47B 21/045 | 248/442.2 |
| 5,308,280 A * | 5/1994 | Dotson | E21F 1/14 | 160/368.1 |
| 5,331,706 A * | 7/1994 | Graham | A47L 13/24 | 15/119.2 |
| 5,345,989 A * | 9/1994 | Brophy | A47H 21/00 | 160/354 |
| 5,375,303 A * | 12/1994 | Shenier | A44B 11/003 | 24/163 FC |
| 5,379,491 A * | 1/1995 | Solo | A42B 1/247 | 224/901.2 |
| 5,384,938 A * | 1/1995 | Frederick | A47G 19/10 | 211/41.2 |
| 5,388,283 A * | 2/1995 | Garnett | E04H 4/10 | 24/563 |
| 5,400,959 A * | 3/1995 | Cone | A47G 29/1216 | 232/34 |
| 5,404,602 A * | 4/1995 | Kondo | A47C 21/022 | 24/499 |
| 5,469,607 A * | 11/1995 | Henningsson | A01G 9/22 | 24/716 |
| 5,497,537 A * | 3/1996 | Robinson | A01G 9/22 | 24/716 |
| 5,524,693 A * | 6/1996 | Hamilton | E06B 9/64 | 160/120 |
| 5,529,326 A * | 6/1996 | Hwang | B62J 1/06 | 280/220 |
| 5,533,418 A * | 7/1996 | Wu | B25J 9/102 | 248/181.1 |
| 5,536,229 A * | 7/1996 | Albergo | A63B 21/00047 | 482/148 |
| 5,542,209 A * | 8/1996 | Sheu | A01G 9/128 | 24/339 |
| 5,551,115 A * | 9/1996 | Newville | A46B 5/0095 | 15/143.1 |
| 5,555,607 A * | 9/1996 | Parveris | F16L 3/13 | 24/129 R |
| 5,558,501 A * | 9/1996 | Wang | F04D 25/088 | 248/159 |
| 5,584,456 A * | 12/1996 | Stephens | A47C 1/143 | 24/339 |
| 5,640,826 A * | 6/1997 | Hurilla, Jr. | E04F 21/1805 | 414/11 |
| 5,645,272 A * | 7/1997 | Brennan, Sr. | B25H 1/00 | 269/68 |
| 5,647,607 A * | 7/1997 | Bolieau | B60R 21/215 | 280/728.2 |
| 5,649,780 A * | 7/1997 | Schall | B25G 1/04 | 403/109.4 |
| 5,666,702 A * | 9/1997 | Ming-Chieh | B42F 1/006 | 24/338 |
| 5,673,741 A * | 10/1997 | Cairns | A47H 1/0022 | 160/330 |
| 5,685,112 A * | 11/1997 | Fara | E04G 21/24 | 52/202 |
| 5,707,032 A * | 1/1998 | Ehrlich | A47G 11/006 | 160/368.1 |
| 5,715,620 A * | 2/1998 | Walker | G09F 21/04 | 15/250.001 |
| 5,722,691 A * | 3/1998 | Patel | B42D 9/00 | 281/42 |
| 5,803,653 A * | 9/1998 | Zuffetti | E04B 2/7457 | 403/363 |
| 5,806,821 A * | 9/1998 | Phillips | F16C 11/106 | 248/288.51 |
| 5,832,652 A * | 11/1998 | Bartys | A01K 97/12 | 43/17 |
| 5,884,424 A * | 3/1999 | Smith | G09F 11/29 | 160/351 |
| 5,897,085 A * | 4/1999 | Cronin | A61G 7/053 | 248/200.1 |
| 5,918,843 A * | 7/1999 | Stammers | F16B 12/2063 | 108/28 |
| 5,924,469 A | 7/1999 | Whittemore | | |
| 5,937,488 A * | 8/1999 | Geiger | F16L 3/1033 | 24/16 PB |
| 5,940,942 A * | 8/1999 | Fong | A44B 1/34 | 24/108 |
| 5,941,434 A * | 8/1999 | Green | A45F 5/02 | 224/195 |
| 5,941,586 A * | 8/1999 | Fann | E04H 4/1609 | 294/104 |
| 5,944,464 A * | 8/1999 | Cole, Jr. | B60P 7/15 | 410/143 |
| 5,979,110 A * | 11/1999 | Tai | A01G 9/128 | 24/339 |
| 6,053,527 A * | 4/2000 | Gans | B60R 21/215 | 280/728.1 |
| 6,067,691 A * | 5/2000 | Feltman | E04B 1/944 | 24/295 |
| 6,082,945 A * | 7/2000 | Jeffries | E04F 21/1816 | 248/354.1 |
| 6,152,434 A * | 11/2000 | Gluck | E04F 21/1805 | 254/114 |
| 6,164,605 A * | 12/2000 | Drake | B60T 17/046 | 24/16 PB |
| 6,170,112 B1 * | 1/2001 | Mayfield | A46B 17/02 | 15/143.1 |
| 6,209,615 B1 | 4/2001 | Whittemore | | |
| 6,209,830 B1 * | 4/2001 | Brotz | F16M 11/14 | 248/181.2 |
| 6,237,182 B1 * | 5/2001 | Cassar | A46B 5/0066 | 15/144.1 |
| 6,321,823 B1 | 11/2001 | Whittemore | | |
| 6,341,401 B1 * | 1/2002 | Lin | A47L 13/144 | 15/119.2 |
| 6,378,175 B1 * | 4/2002 | Vanderpan | A01G 9/128 | 24/336 |
| 6,467,741 B1 * | 10/2002 | Shih | E04G 25/06 | 248/200.1 |
| 6,474,609 B1 * | 11/2002 | Pinard | A47H 1/18 | 160/348 |
| 6,490,749 B1 * | 12/2002 | Morad | A47L 13/144 | 15/119.1 |
| 6,508,295 B2 | 1/2003 | Whittemore | | |
| 6,523,231 B1 * | 2/2003 | Lassiter | F16L 3/237 | 24/129 R |
| 6,564,512 B1 * | 5/2003 | Whittemore | B08B 15/00 | 248/694 |
| 6,729,358 B1 * | 5/2004 | Moffatt | B21F 1/002 | 140/104 |
| 6,908,250 B2 | 6/2005 | Moffatt | | |
| 6,942,004 B2 | 9/2005 | Whittemore | | |
| 6,953,076 B2 | 10/2005 | Whittemore | | |
| 7,073,758 B2 * | 7/2006 | Whittemore | E04G 21/30 | 24/338 |
| 7,108,040 B2 | 9/2006 | Whittemore | | |
| 7,261,140 B2 | 8/2007 | Whittemore | | |
| 7,503,373 B2 | 3/2009 | Whittemore | | |

(56) References Cited

U.S. PATENT DOCUMENTS

| | | | |
|---|---|---|---|
| 7,533,712 B2 | 5/2009 | Whittemore et al. | |
| 7,658,219 B2 | 2/2010 | Whittemore | |
| 7,670,401 B2* | 3/2010 | Whittemore | B01D 46/0005 55/480 |
| 7,717,382 B2* | 5/2010 | Whittemore | B65H 49/26 156/577 |
| 7,743,512 B1* | 6/2010 | Whittemore | B26B 3/04 30/279.2 |
| 7,775,495 B2* | 8/2010 | Trachet | B25J 17/0275 248/181.1 |
| 7,789,927 B2* | 9/2010 | Tramontina | E04G 21/243 160/351 |
| 7,810,771 B1* | 10/2010 | Akers | E04G 21/24 160/368.1 |
| 8,066,051 B2 | 11/2011 | Whittemore | |
| 8,196,877 B2* | 6/2012 | Gridley | E04H 15/60 248/160 |
| 8,371,360 B2 | 2/2013 | Whittemore | |
| 8,857,499 B2 | 10/2014 | Whittemore | |
| 8,875,774 B1* | 11/2014 | Flores | E04G 21/30 160/351 |
| 9,115,539 B2* | 8/2015 | Whittemore | E06B 5/025 |
| 9,441,392 B2 | 9/2016 | Whittemore | |
| 9,663,962 B1* | 5/2017 | Whittemore | E04G 21/243 |
| 2001/0017339 A1* | 8/2001 | Brotz | F16M 11/14 248/187.1 |
| 2001/0029640 A1* | 10/2001 | Cassar | A46B 5/0066 15/144.1 |
| 2002/0011316 A1* | 1/2002 | Whittemore | A47H 21/00 160/368.1 |
| 2003/0028988 A1* | 2/2003 | Streutker | A47L 13/24 15/228 |
| 2003/0070773 A1 | 4/2003 | Whittemore | |
| 2003/0154588 A1* | 8/2003 | Blacket | B21J 15/025 29/456 |
| 2004/0065799 A1* | 4/2004 | Whittemore | E04G 21/30 248/354.1 |
| 2004/0194418 A1* | 10/2004 | Gouley | E04G 17/14 52/831 |
| 2004/0200585 A1 | 10/2004 | Whittemore | |
| 2005/0247414 A1* | 11/2005 | Whittemore | E04G 21/26 160/351 |
| 2005/0284591 A1 | 12/2005 | Whittemore | |
| 2006/0272785 A1 | 12/2006 | Whittemore | |
| 2008/0006374 A1 | 1/2008 | Whittemore | |
| 2009/0071614 A1 | 3/2009 | Whittemore | |
| 2010/0108849 A1 | 5/2010 | Whittemore | |
| 2010/0276090 A1* | 11/2010 | Zagone | E04G 21/30 160/368.1 |
| 2012/0049034 A1 | 3/2012 | Whittemore | |
| 2014/0212204 A1* | 7/2014 | Belleau | F16C 11/0623 403/122 |
| 2014/0263916 A1* | 9/2014 | Behringer | E04G 21/243 248/357 |
| 2015/0052843 A1 | 2/2015 | Whittemore | |
| 2016/0356040 A1* | 12/2016 | Whittemore | E04G 21/245 |
| 2017/0009473 A1 | 1/2017 | Whittemore | |
| 2017/0020322 A1* | 1/2017 | Whittemore | E04G 21/243 |
| 2019/0390706 A1* | 12/2019 | Graber | F16C 11/069 |

FOREIGN PATENT DOCUMENTS

| | | |
|---|---|---|
| DE | 29605222 | 7/1996 |
| EP | 0976351 | 2/2000 |
| FR | 2411282 | 7/1979 |
| GB | 1042086 | 9/1966 |
| GB | 2156894 | 10/1985 |
| GB | 2325397 | 11/1998 |
| JP | 2001503487 | 3/2001 |
| JP | 2003206640 | 7/2003 |
| WO | 8603538 | 6/1986 |
| WO | 9109556 | 7/1991 |
| WO | 9424780 | 12/1994 |

OTHER PUBLICATIONS

"KwikPole", Brochure by KwikPole, Inc. www.kwikpole.com/setup.html (Aug. 2003).

"Mr. Long Arm", Brochure by Mr. LongArm, Inc., 2004.

"Quickprop", Brochure by Protecta Screen Ltd, Aug. 1996.

"Snapwall Temporary Wall Support", brochure by C&S Manufacturing Inc.

"Third Hand", Brochure by FastCap, LLP, 2003.0.

MIIx Co., Ltd. "Magic Wall". http://www1.mllx.co.jp/.

North American Marketing Representatives, Inc. "Power Pole". http:/www.waldmannbenches.com/power5205pole520content.htm (Nov. 2004).

"Mounting Unit for Partition Mount" Specification, Drawings and Prosecution History of U.S. Appl. No. 15/170,155, filed Jun. 1, 2016, now U.S. Pat. No. 10,428,539, issued on Oct. 1, 2019 by Jeffrey P. Whittemore.

\* cited by examiner

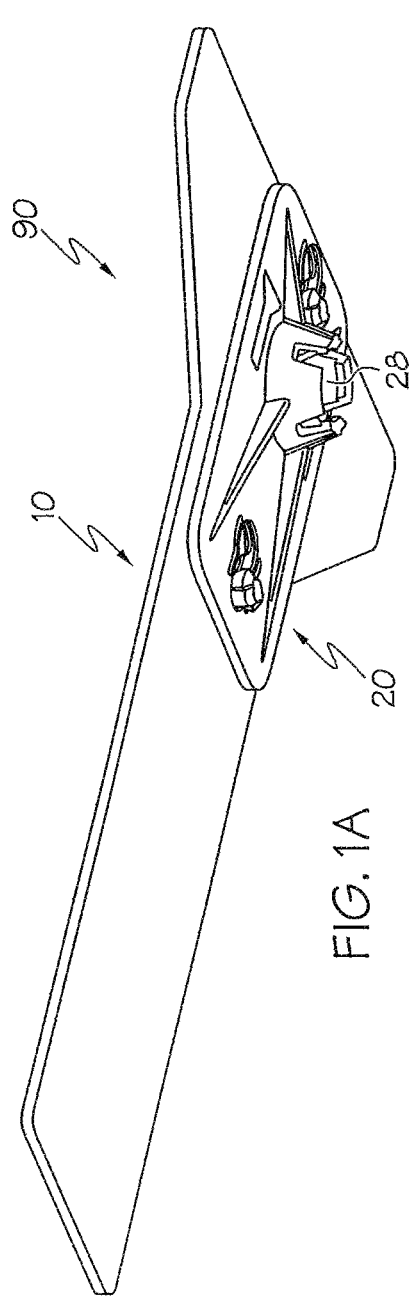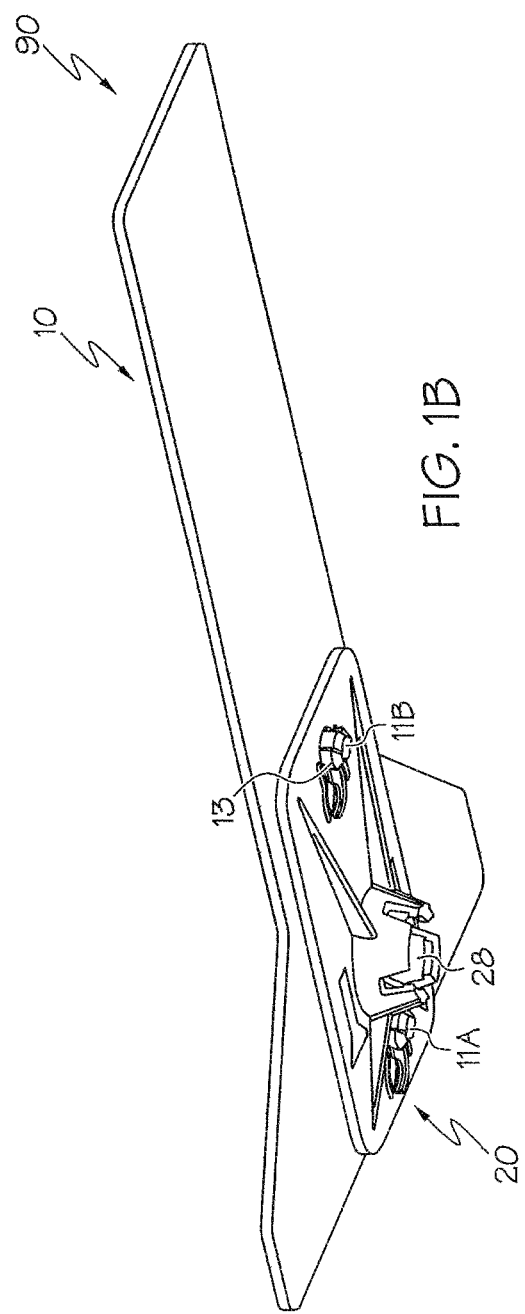

MOUNTING UNIT FOR PARTITION MOUNT

RELATED APPLICATIONS

This application is a Continuation Application of U.S. Ser. No. 15/170,155, filed on Jun. 1, 2016, which claims the benefit of U.S. Provisional Patent Application Ser. No. 62/170,308, filed Jun. 3, 2015 the content of each being incorporated herein by reference in its entirety.

This application is related to: U.S. Pat. No. 5,924,469, issued Jul. 20, 1999; U.S. Pat. No. 6,564,512, issued May 20, 2003; U.S. Pat. No. 7,073,758, issued Jul. 11, 2006; U.S. Pat. No. 7,533,712, issued May 19, 2009; U.S. Pat. No. 7,658,219, issued Feb. 9, 2010; U.S. Pat. No. 7,670,401, issued Mar. 2, 2010; U.S. Pat. No. 7,743,512, issued Jun. 29, 2010; U.S. Pat. No. 7,717,382, issued May 18, 2010; U.S. patent application Ser. No. 14/517,062, filed Oct. 17, 2014; U.S. Pat. No. 9,115,539, issued Aug. 25, 2015, and U.S. patent application Ser. No. 14/597,641, filed Jan. 15, 2015, now U.S. Pat. No. 9,663,962, the content of each being incorporated herein by reference in its entirety.

The mounting unit of this application may be used in connection with embodiments of any of the above patents and patent applications.

BACKGROUND

Partition systems are often employed to isolate portions of a building or room, by serving as a barrier to dust, noise, light, odors, and the like. In construction zones, partitions are useful for protecting a clean area from a work area, for example, protecting an area where furniture and rugs are temporarily stored from an area where wood floors are being refinished.

Workers at construction sites often use rudimentary techniques for installing partitions. Some simply nail, screw, or staple the curtain or partition material to the floor, ceiling, and abutting walls, resulting in damage to their surfaces. Others tape, or otherwise adhere, a curtain or plastic sheet to the walls and ceilings. The tape usually fails to stick, but if it does stick, as the tape is removed, paint can pull off with the tape, or adhesive is left behind.

U.S. Pat. Nos. 5,924,469 and 7,658,219, the contents of which are incorporated herein by reference, disclose partition mount systems that addresses these limitations. These systems offer the advantage of accommodating standard extension poles, for example, painters poles, and is compatible with a variety of commercially-available curtain or drape materials, for example plastic, cloth, and the like. The disclosed systems are "clean" systems designed to be installed and removed without damaging or otherwise marking the ceiling, floor or walls in the construction zone. Assembly is easy and fast and can be accomplished by a single individual.

Many ceilings, for example drop ceilings consist of gridwork of, for example, metal channels which snap together in regularly spaced apart patterns of cells. Each cell is then filled with lightweight ceiling tiles or panels which simply drop into the grid. It is common for the partition mount systems described in connection with U.S. Pat. Nos. 5,924, 469 and 7,658,219 to be used in connection with such drop ceilings. In such configurations, placement of the mounting head directly under a tile or directly under an unsupported section of the metal channels can cause the drop ceiling channels or tiles to shift in position.

SUMMARY

Embodiments of the present inventive concepts are directed to a partition mount system that mitigates or eliminates movement of ceiling tiles in a drop ceiling caused by force induced by a mounting unit of a partition mount system. The system accomplishes this in a manner that avoids damage to the ceiling surface.

According to an aspect of the present inventive concepts, there is provided a mounting unit of a partition mount system that removably secures a sheet of material. The mounting unit includes a first portion having a first end and a second end opposite the first end and a pivot on a lower surface thereof and a second portion having a first end and a second end opposite the first end and configured to mate with the first portion. The first end of the second portion is wider than the second end of the second portion. The first portion and second portion are configured to secure a sheet of material therebetween. In some embodiments, the second portion is T-shaped.

In some embodiments, the pivot is a socket for a ball and socket.

In some embodiments, the socket is positioned a first distance from the first end of the first portion and a second distance from the second end of the first portion. The second distance is greater than the first distance.

In some embodiments, the socket is closer to the first end of the first portion than to the second end of the first portion.

In some embodiments, the pivot is a ball for a ball and socket.

In some embodiments, the second portion includes at least one pin and wherein the first portion includes at least one aperture that receives the at least one pin.

In some embodiments, the at least one pin and the at least one aperture mate in a snap-fit relationship to secure the first and second portions together.

In some embodiments, at least one pin comprises first and second pins. The first pin is spaced apart from the first end of the second portion a first distance and the second pin is spaced apart from the first end of the second portion a second distance which is greater than the first distance. The first and second pins are positioned along the second portion closer to the first end of the second portion than to the second end of the second portion.

In some embodiments, the at least one aperture includes a keyhole and slot, and the mating at least one pin includes a retaining knob. The first portion and second portion are secured by inserting each pin in a mating keyhole and sliding the pin from the keyhole and into the slot where the pin is retained in the aperture by the retaining knob.

In some embodiments, the first portion includes a head and the second portion includes a clip that is removably coupled to the head.

In some embodiments, the mounting unit further includes a high-friction material applied to an upper surface of the second portion.

In some embodiments, the mounting unit further includes a high-friction material coupled to at least one of the first portion and the second portion at a position where the first portion and the second portion interface.

According to another aspect of the present inventive concepts, there is provided a partition mount. The partition mount includes an elongated adjustable-length pole having a foot end and a head end. The pole is adjustable in length between the foot end and the head end and has a longitudinal axis. The pole has a joint ball at the head end. The partition mount further includes a mounting unit that removably secures a sheet of material. The mounting unit includes a first portion having a first end and a second end opposite the first end and a pivot on a lower surface thereof. The joint ball is configured to be inserted in the socket. The mounting unit further includes a second portion having a first end and a second end opposite the first end and configured to mate with the first portion. The first end of the second portion being wider than the second end of the second portion. The first portion and second portion are configured to secure a sheet of material there between.

In some embodiments, the second portion is T-shaped.

In some embodiments, the pivot is a socket for a ball and socket.

In some embodiments, the socket is positioned a first distance from the first end of the first portion and a second distance from the second end of the first portion. The second distance is greater than the first distance.

In some embodiments, the socket is closer to the first end of the first portion than to the second end of the first portion.

In some embodiments, the pivot is a ball for a ball and socket.

In some embodiments, the second portion includes at least one pin and the first portion includes at least one aperture that receives the at least one pin.

In some embodiments, the at least one pin and the at least one aperture mate in a snap-fit relationship to secure the first and second portions together.

In some embodiments, the at least one pin includes first and second pins. The first pin is spaced apart from the first end of the second portion a first distance and the second pin is spaced apart from the first end of the second portion a second distance which is greater than the first distance. The first and second pins are positioned along the second portion closer to the first end of the second portion than to the second end of the second portion In some embodiments, the at least one aperture includes s a keyhole and slot, and the mating at least one pin includes a retaining knob. The first portion and second portion are secured by inserting each pin in a mating keyhole and sliding the pin from the keyhole and into the slot where the pin is retained in the aperture by the retaining knob.

In some embodiments, the first portion includes a head and the second portion includes a clip that is removably coupled to the head.

In some embodiments, the partition mount further includes a high-friction material applied to an upper surface of the second portion.

In some embodiments, the partition mount further includes a high-friction material coupled to at least one of the first portion and the second portion at a position where the first portion and the second portion interface.

In some embodiments, the joint ball is egg-shaped.

According to another aspect of the present inventive concepts, an asymmetric mounting unit includes a clip and a head. The head has a primary center axis and a secondary center axis. The primary center axis is longer than the secondary center axis. The head includes a pivot. A center point of the pivot of the head is positioned asymmetrically along the primary center axis between the secondary center axis and an end of the head.

In some embodiments, the clip is wider along the secondary axis than the head.

In some embodiments, the clip comprises a length along the primary axis and a width along the secondary axis and the length of the clip along the primary axis is longer than the width of the clip along the secondary axis.

According to another aspect of the present inventive concepts, an asymmetric mounting unit includes clip and a head. The head has a primary center axis and a secondary center axis, wherein the primary center axis is longer than the secondary center axis. The head includes a pivot. A center point of the pivot of the head is positioned along the primary axis, and the clip is wider in a direction along the secondary axis than the head.

In some embodiments, the center point of the pivot of the head is positioned asymmetrically along the primary center axis.

In some embodiments, the clip comprises a length along the primary center axis and a width along the secondary center axis and the length of the clip along the primary center axis is longer than the width of the clip along the secondary center axis.

According to another aspect of the present inventive concepts, an asymmetric mounting unit includes a clip and a head. The head has a primary center axis and a secondary center axis, wherein the primary center axis is longer than the secondary center axis. The head includes a pivot. A center point of the pivot of the head is positioned along the primary center axis, and the clip includes a length along the primary center axis and a width along the secondary center axis. The length of the clip along the primary center axis is longer than the width of the clip along the secondary center axis.

In some embodiments, the center point of the pivot of the head is positioned asymmetrically along the primary center axis.

In some embodiments, the clip is wider along the secondary center axis than the head.

In some embodiments, the head is smaller than the clip along the primary center axis and along the secondary center axis.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

FIGS. 1A-1C are perspective, bottom views of a mounting unit in accordance with embodiments of the present inventive concepts.

DETAILED DESCRIPTION OF EMBODIMENTS

Figure 1C:
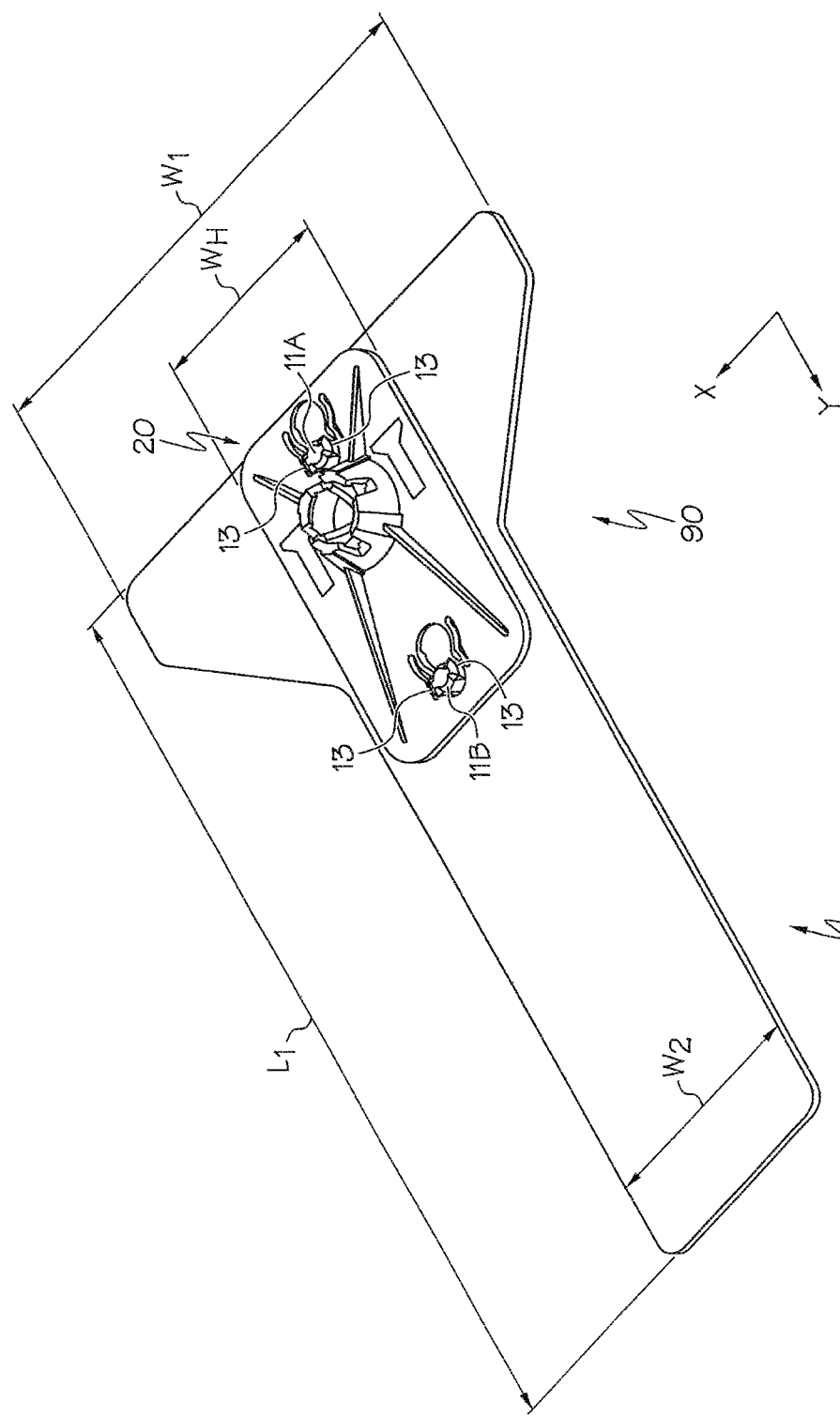

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present inventive concepts.

Embodiments of the present inventive concepts are directed to a partition mount system that mitigates or eliminates movement of ceiling tiles in a drop ceiling caused by force induced by mounting unit of a partition mount system. The system accomplishes this in a manner that avoids damage to the ceiling surface. The partition mount system of the present inventive concepts includes an elongated adjustable-length pole and a mounting unit. A pivot joint of the elongated adjustable-length pole is coupled to a socket of the mounting unit.

Figure 2A:
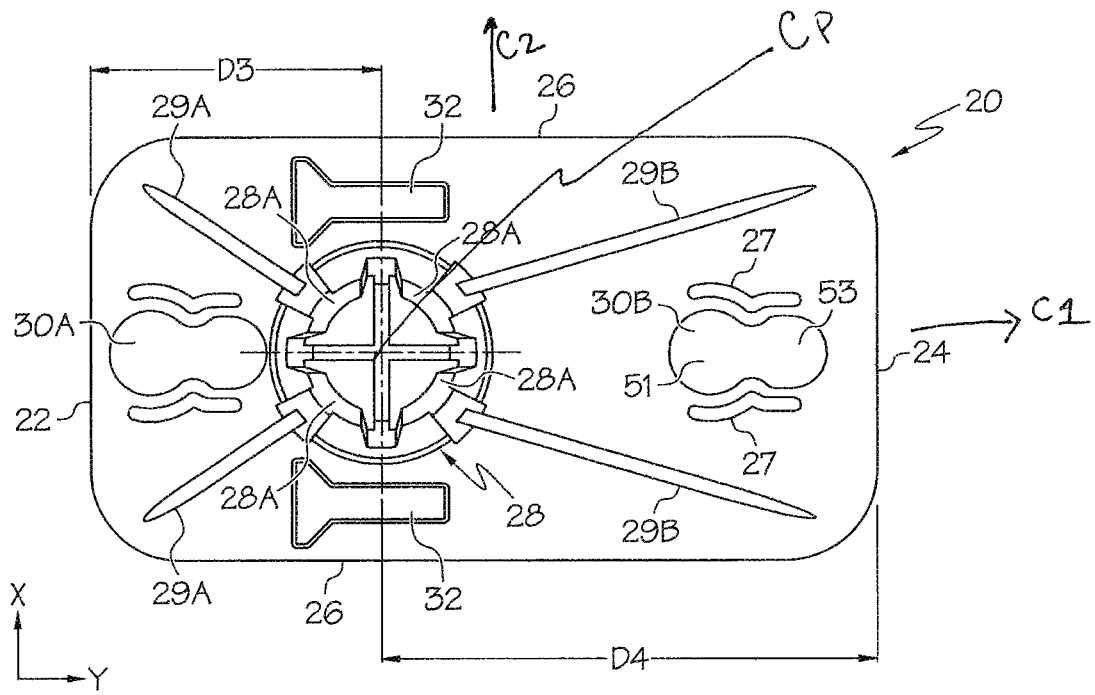
FIGS. 2A-2C are bottom views of a head of the mounting unit of FIGS. 1A-1C.
Figure 2B:
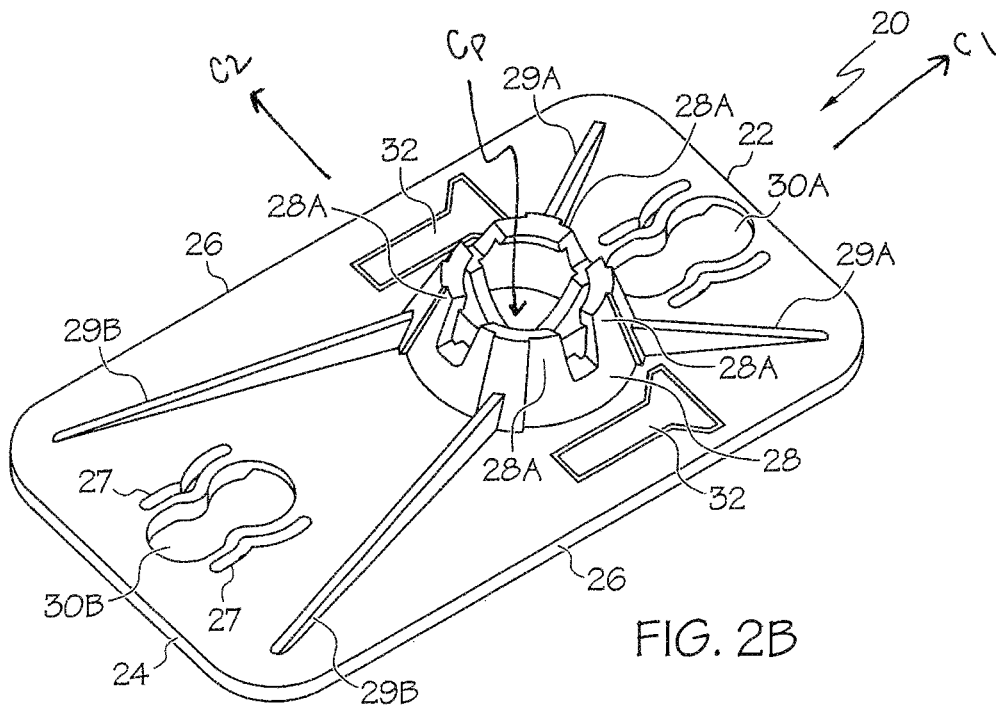
Figure 2C:
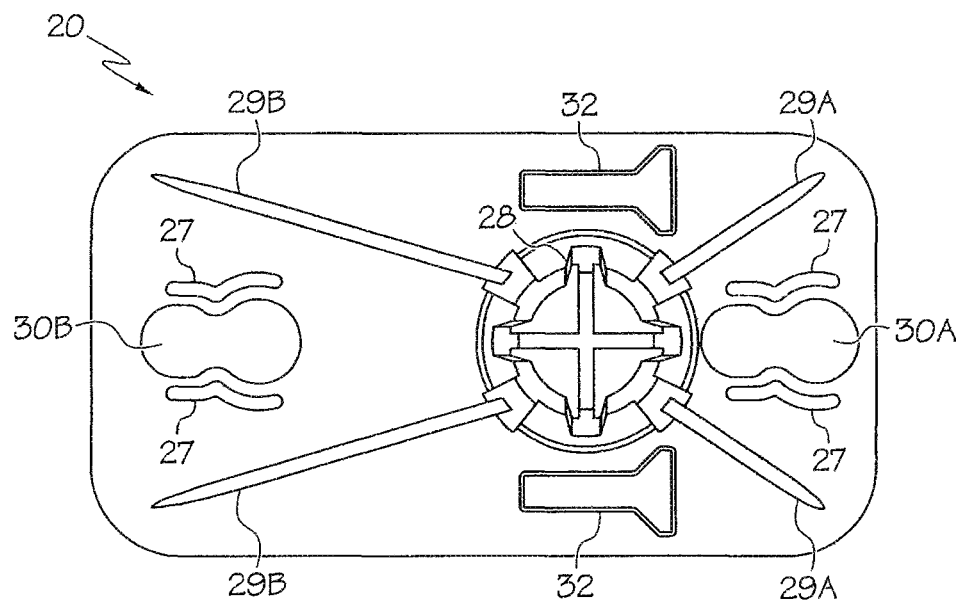
Figure 2D:
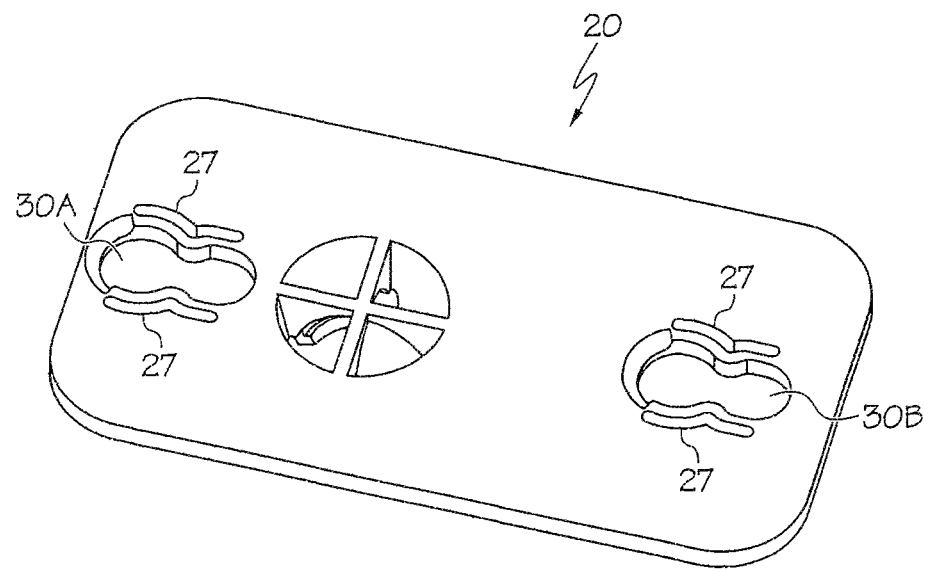
FIGS. 2D-2E are top views of the head of FIGS. 2A-2C.
Figure 2E:
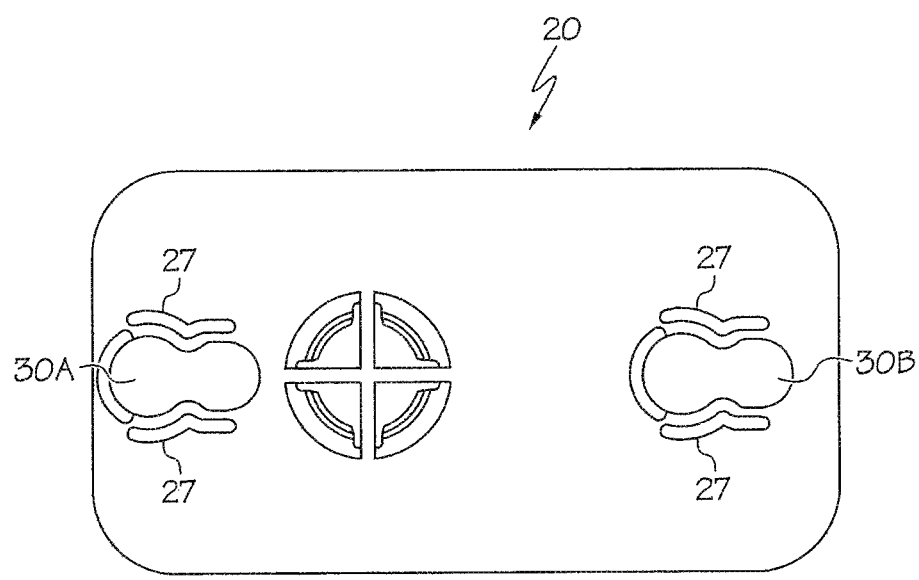
Figure 2F:
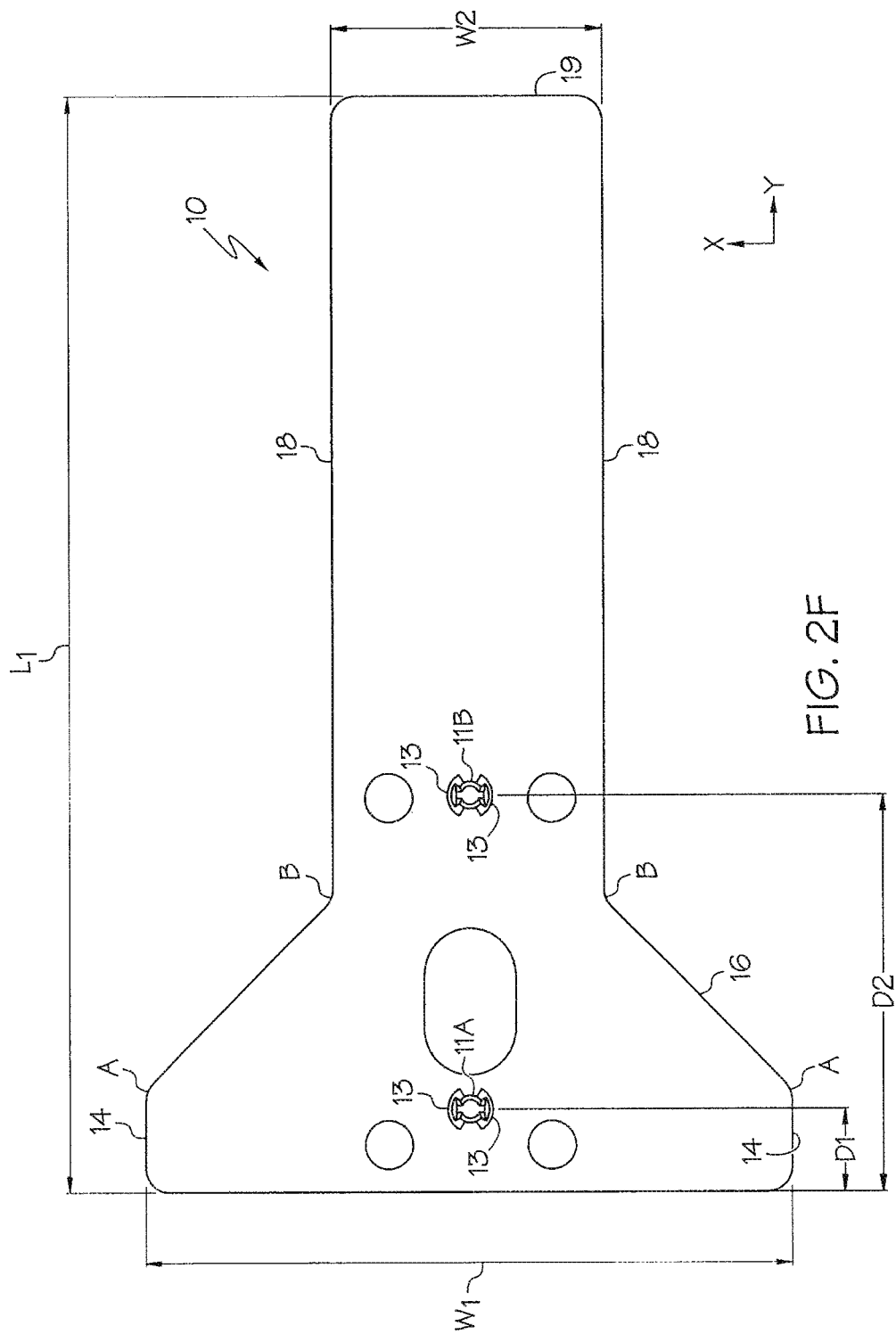
FIG. 2F-2G are bottom views of a clip of the mounting unit of FIGS. 1A-1C in accordance with embodiments of the present inventive concepts.
Figure 2G:
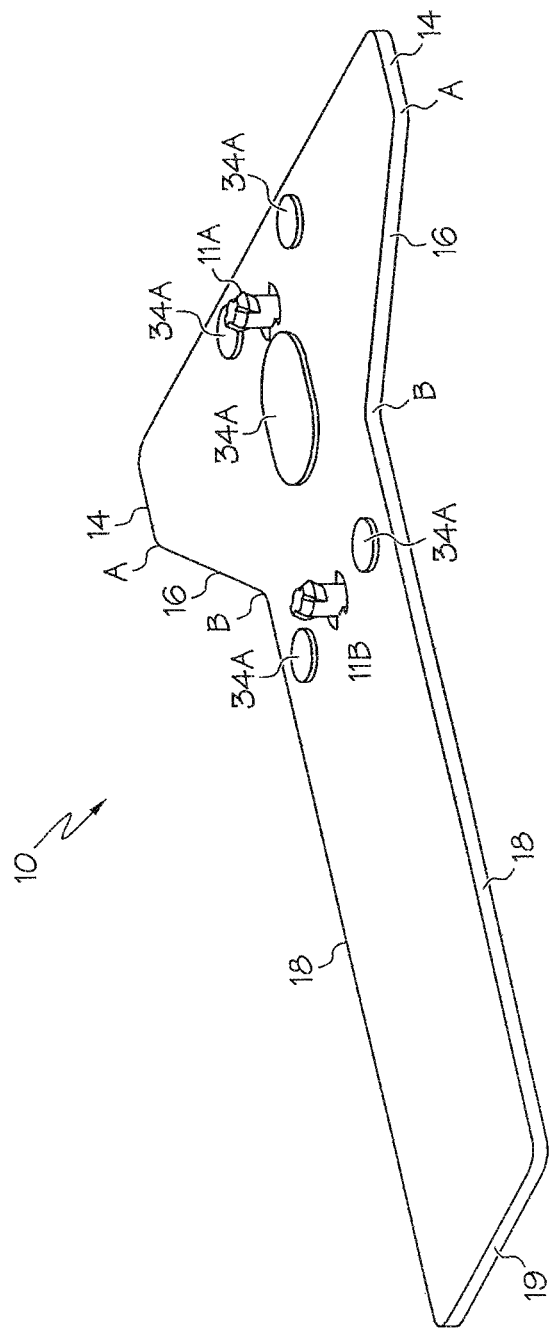
Figure 2H:
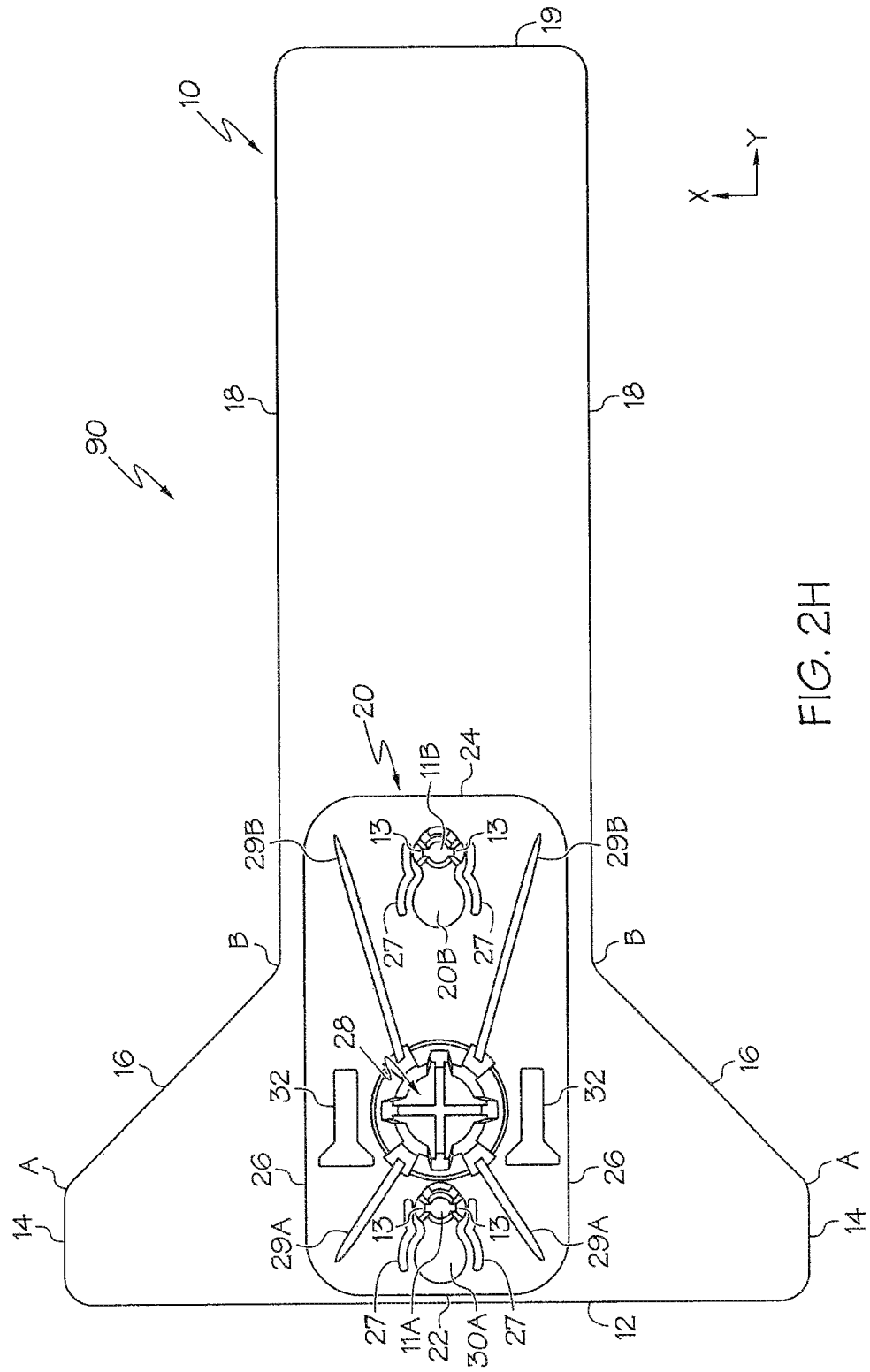
FIG. 2H is a bottom view of the mounting unit of FIGS. 1A-1C in accordance with embodiments of the present inventive concepts.

FIGS. 1A-1C is perspective, bottom view of a mounting unit 90 in accordance with embodiments of the present inventive concepts. FIGS. 2A-2C are bottom views of a head 20 of the mounting unit 90 of FIGS. 1A-1C. FIGS. 2D-2E are top views of the head 20 of FIGS. 2A-2C. FIG. 2F-2G are bottom views of a clip 10 of the mounting unit 90 of FIGS. 1A-1C in accordance with embodiments of the present inventive concepts. FIG. 2H is a bottom view of the mounting unit 90 of FIGS. 1A-1C in accordance with embodiments of the present inventive concepts.

In some embodiments, a mounting unit 90 of the present inventive concepts includes a first portion, for example, a head 20, constructed and arranged to be coupled to an elongated adjustable-length pole and a second portion, for example, a clip 10, constructed and arranged to be coupled to the head 20. The head 20 and clip 10 are constructed and arranged to secure a sheet of material therebetween. The sheet of material can be coupled to the head 20 by the clip 10 and raised to the ceiling by an operator of the adjustable-length pole. In some embodiments, multiple poles and mounting units can be positioned at various positions along the sheet of material. In this manner, the sheet of material can be positioned in place by the mounting system.

Figure 5:
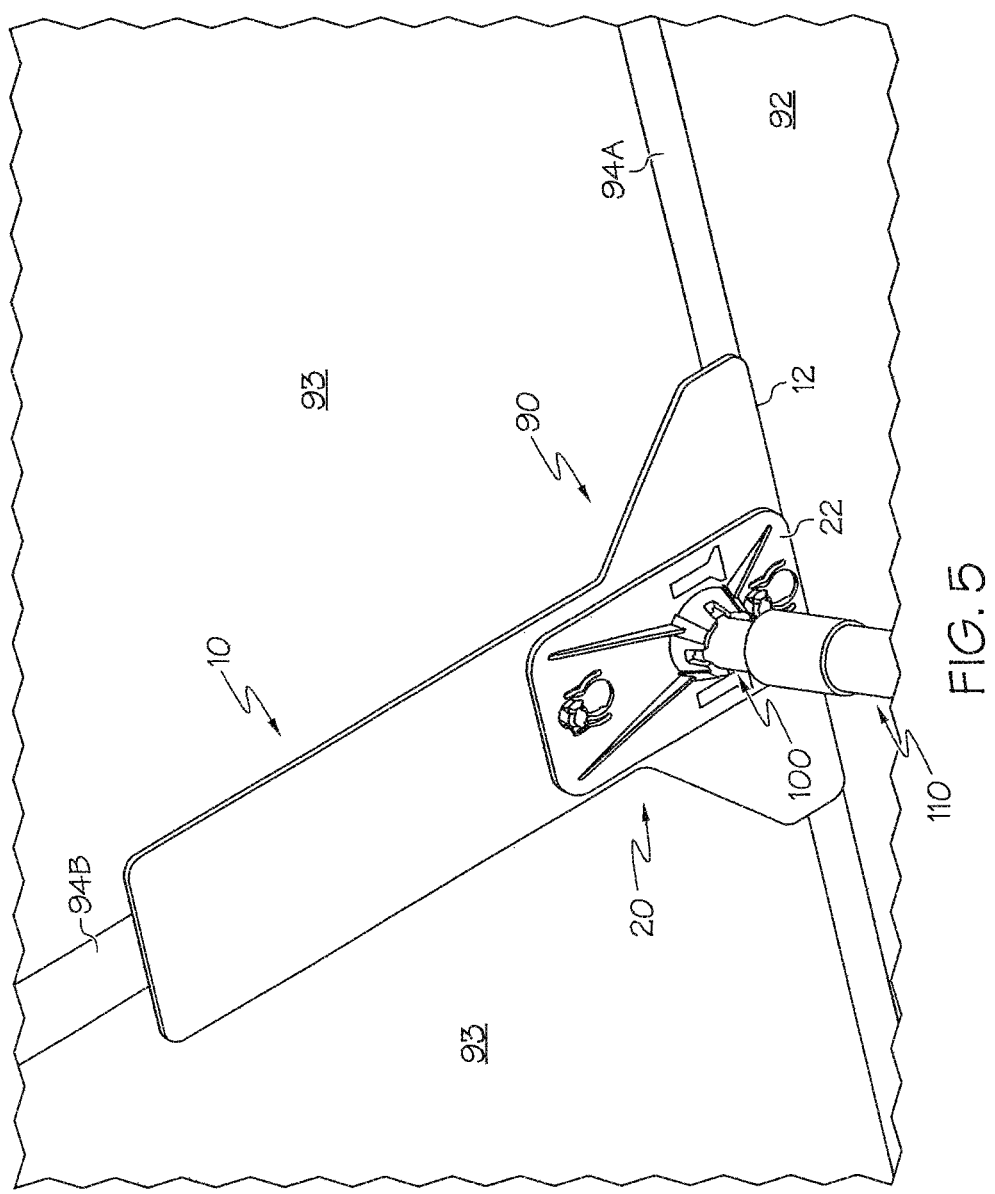
FIG. 5 is a perspective view of the mounting unit of FIGS. 1A-1C coupled to an elongated adjustable-length pole and positioned between a drop ceiling and a floor in accordance with embodiments of the present inventive concepts.

In general, and referring now to FIG. 5, the channels 94A, 94B of a drop ceiling include wall channels 94A that are positioned directly along a wall 92 and intermediate channels 94B that are suspended, or hung, from the upper, structural ceiling, and clipped to the wall channels 94A, usually at a 90 degree angle and usually at regular intervals. The intermediate channels 94B form a grid of channels between the wall channels 94A. Together, the grid of intermediate channels 94B and wall channels 94A form an array of positions or locations at which ceiling tiles 93 can be mounted. In many drop ceiling installations, the wall channels 94A are structurally sounder than the intermediate channels 94B. In general, this is attributable to the fact that the wall channels 94A are mounted directly to the wall 92, and therefore can be fastened to the wall 92 at regular intervals and by secure means. In contrast, the intermediate channels 94B are often times suspended from the structural ceiling using wires or clips, and therefore are subject to relatively more play in their vertical, and sometimes horizontal, positions.

With this in mind, when installing partition mounting systems of the types described herein, it is generally desired that the partition mounting system be installed at a secure location below a drop ceiling so that the force imparted by the partition mounting system, whether from the vertical force imparted from the partition mounting system, for example, a spring-loaded pole, or whether from a horizontal force imparted by the movement of air onto the supported curtain or drape, not adversely affect the position of the components of the drop ceiling to which it is mounted. Accordingly, it is common for users of such systems to install pole mounts to interface directly with the most durable component of the drop ceiling; namely, the wall channels 94A.

In embodiments of the present inventive concepts, it can be seen that several advantages are realized. Since it can be desired that the force imparted by the partition mounting system be applied as much as possible to the relatively reinforced wall channels 94A, in one embodiment, continuing to refer to FIG. 5, the socket joint 28 of the head 20 is asymmetrically positioned on the head 20. In other words, the center point of the socket joint 28 of the head 20 is positioned on the head 20 between a geometric center of the head 20 and an edge 22 of the head 20. In the example shown, the head 20 is rectangular having a primary center axis C1 and a secondary center axis C2, and the center point Cp of the socket joint 28 is not positioned at the intersection of the primary center axis C1 and the secondary center axis C2. Instead, in this embodiment, the center point Cp of the socket joint 28 is positioned along the primary center axis C1 between the secondary center axis C2 and the edge 22 of the head 20. In this manner, when the clip 10 is coupled to the head 20, and the clip 10 is placed in position at the reinforced wall channel 94A, the movement between the wall channel 94A and the socket joint 28 can be reduced. Therefore, the force imparted by the head 20 on the wall channel 94A can be closer to the wall channel 94A, as compared to a case where the socket joint 28 would be positioned at a geometric center of the head 20. In some installations, this ensures that relatively more of the imparted force is applied to the wall channel 94A and relatively less of the imparted force is applied to the intermediate channel 94B or tile 93. In some installations, this can mitigate or prevent inadvertent re-positioning of the intermediate channel 94B or tile 93, and possible resulting compromise of the partition installation.

In another advantage, in some embodiments, and referring now to FIG. 5 and additionally FIG. 1C, the width of the clip 10 in the wall channel direction along the X-axis, for example, width W1 of the embodiment of FIG. 1C, is greater than the width of the head $W_H$ in the direction of the wall channel along the X-axis. Such a configuration is advantageous in that it provides for a distribution of the force applied to the socket joint 28 by the pole further along the relatively secure wall channel 94A, providing for an installation of relatively increased strength.

In another advantage, in some embodiments, continuing to refer to FIG. 5 and additionally to FIG. 1C the length of the clip in a direction of the intermediate channel 94B along the Y-axis, for example length L1 of the embodiment of FIG. 1C is greater than the width of the clip 10 in the wall channel direction along the X-axis, for example, width W1 of FIG. 1C. Such a configuration is advantageous in that it provides for further distribution of the force applied to the socket joint 28 by the pole along the relatively less secure intermediate channel 94B. By distributing the force applied to the intermediate channel 94B more expansively, an installation of relatively increased strength can be achieved. This can, in some installations, prevent cantilevering, or rolling, of the head and clip vertically into the intermediate channel 94B and ceiling tile relative to the secure wall channel 94A, which could otherwise operate as a pivot point for the system. In some embodiments, the clip 10 of the mounting unit 90 may have a T-shape, as illustrated in FIGS. 2F-2H. As described herein, the T-shaped clip 10 can operate to distribute applied force pressure along a side of a wall so that the mounting unit 90 does not roll in a vertical direction pushing up on the grid-work and ceiling tiles of a drop ceiling. With reference to FIG. 2F, the T-shaped clip 10 has a first edge 12 extending in a first direction, for example, an X-axis direction, and having a first width W1 and a second edge 19 opposite the first edge 12 extending in the first direction of the X-axis having a second width W2 which is less than the first width W1. First side edges 14 of the clip 10 extend from ends of the first edge 12 in a second direction, for example, a Y-axis direction, substantially perpendicular to the first direction of the X-axis to a point A. In some embodiments, second side edges 16 extend from point A of the first side edges 14 and are tapered from the first width to the second width at point B. In some embodiments, third side edges 18 extend from point B in the second direction Y substantially perpendicular to the first direction X to the second edge 19.

T-shaped may be defined as having a first edge having a first width, a second edge opposite the first edge having a second width less than the first width, and a length greater than the width of the clip in the direction perpendicular to the first width.

In some embodiments, the clip 10 may comprise a T-shaped flat plate and may include two pins 11A, 11B that extend from its lower surface. In some embodiments, the pins 11A, 11B include retaining knobs or lobes 13 at their distal ends. In some embodiments, the pins 11A, 11B and retaining knobs 13 are configured such that the clip 10 may be formed in a straight-pull molding process. A first pin 11A may be spaced apart from the first edge 12 a first distance D1 and a second pin 11B may be spaced apart from the first edge a second distance D2 which is greater than the first distance D1. Both of the pins 11A and 11B may be positioned along the clip 10 closer to the first edge 12 than to the second edge 19.

The clip 10 may include high-friction-material surface pads 34A at a lower surface thereof, as illustrated in FIG. 2G. In this manner, when the clip 10 is mounted to the head 20 with a sheet of material therebetween, the pads 34A help to further secure the sheet of material by preventing slipping.

In some embodiments, the head 20, as illustrated in FIG. 2A, may include a first end 22, a second end 24 opposite the first end 22 and third and fourth ends 26 connecting the first end 22 and the second end 24. In some embodiments, the head 20 is rectangular in shape and has a primary axis extending in the direction of the Y-axis and a secondary axis extending in the direction of the X-axis. In some embodiments, the head 20 may comprise a substantially flat plate, and may include apertures 30A, 30B. The apertures 30A, 30B are in the shape of relatively large keyhole 51 that extends into a relatively narrow slot 53. Flex grooves 27 are formed through the body of the head 20 spaced apart a suitable distance from sidewalls of the apertures 30A, 30B. The flex grooves 27 provide the sidewalls of the apertures 30A, 30B with a suitable degree of flexibility.

In some embodiments, the head 20 is adapted to interface with a universal joint ball of an adjustable-length pole, for example, those described in connection with U.S. Pat. Nos. 5,924,469 and 7,658,219, the contents of which are incorporated herein by reference. The head 20 includes a socket joint 28 on a bottom portion thereof constructed and arranged to mate with a pivot joint at an end of the elongated adjustable-length pole which permits pivot of the mounting unit 90 relative to the elongated adjustable-length pole. In some embodiments, the socket 28 on the bottom portion of the head 20 is not centered along the head 20, but rather is positioned at an asymmetric position on the primary axis Y. In some embodiments, the center point Cp of the socket 28 is positioned a first distance D3 from the first end 22 of the head 20 and a second distance D4 from the second end 24 of the head 20, and the second distance D4 is greater than the first distance D3. That is, the socket 28 is positioned on the bottom surface of the head 20 at a position closer to the first end 22 of the head 20 than a second end 24 of the head 20. During installation, the first end 22 of the head 20 and the first edge 12 of the clip 10 of the mounting unit 90 may be positioned at a portion of the ceiling intersection with a wall. The socket 28 being formed at the first end 22 of the head 20 that is positioned closer to the wall pushes a pivot point of the mounting unit 90 relative to the elongated adjustable-length pole closer to the wall so that the force imparted by the head 20 on the wall channel 94A can be closer to the wall channel 94A. In some installations, this can mitigate or prevent inadvertent re-positioning of the intermediate channel 94B or tile 93 and possible resulting compromise of the partition installation.

In some embodiments, the socket joint 28 is a universal joint ball that mates with a socket of an adjustable-length pole.

The socket 28 and the universal joint ball of the adjustable-length pole, for example, those described in connection with U.S. Pat. Nos. 5,924,469 and 7,658,219, in combination, form a universal joint. In some embodiments, the socket 28 includes elastically deformable teeth 28A that expand around the universal joint ball, when inserted, to provide a snap-fit relationship. Images 32 are formed on the bottom surface of the head 20 spaced apart a suitable distance from sidewalls of the socket 28. The images 32 illustrate the shape of the clip 10. The images 32 illustrate to a user the preferred positioning of the head 20 relative to the clip 10.

In some embodiments, the head 20 further includes ribs 29A, 29B that extend outward from the outer walls of the teeth 28A of the socket 28. The ribs 29A, 29B provide structural integrity to the socket 28 and head 20. In some embodiments, since the socket 28 is positioned asymmetrically along the primary axis of the head 20, the ribs 29B are longer than the ribs 29A.

As illustrated in FIG. 2H, the apertures 30A, 30B of the head 20 are constructed and arranged to receive the pins 11A, 11B of the clip 10. The clip 10 is illustrated with two pins 11A, 11B, however, a mating clip and head with other numbers of pins and corresponding apertures are equally applicable to the present inventive concepts.

During an installation operation, the pins 11A, 11B and retaining knobs 13 of the clip 10 are positioned over the large keyholes 51 of the apertures 30A, 30B of the head 20. A curtain to be installed (not shown) is placed between the clip 10 and head 20. The pins 11A, 11B and retaining knobs 13 are moved into position near keyholes 51 of the apertures 30A, 30B of the head. The pins 11A, 11B and retaining knobs 13 of the clip 10 are inserted into the keyholes 51 of the apertures 30A, 30B of the head 20. At this time, the curtain material is primarily positioned between the lower surface of the clip 10 and the upper surface of the head 20, with the exception of the pins 11A, 11B and aperture 30A, 30B region, in which the curtain material extends about the body of the pins 11A, 11B. The clip 10 and head 20 are then pushed relative to each other in the second direction Y, so that the body of the pins 11A, 11B engage the inner sidewalls of the apertures 30A, 30B of the head 20. The flex grooves 27 cause the aperture sidewalls to flex about the body of the pins 11A, 11B, and the clip 10 is snapped into place when the pins 11A, 11B are seated in the relatively narrow slots 153 of the apertures 30A, 30B. The pins 11A, 11B of the clip 10 are seated in the aperture slots 53, and the retaining knobs 13 abut the lower surface of the head 20, thereby securing the curtain material held in position there between.

Figure 2I:
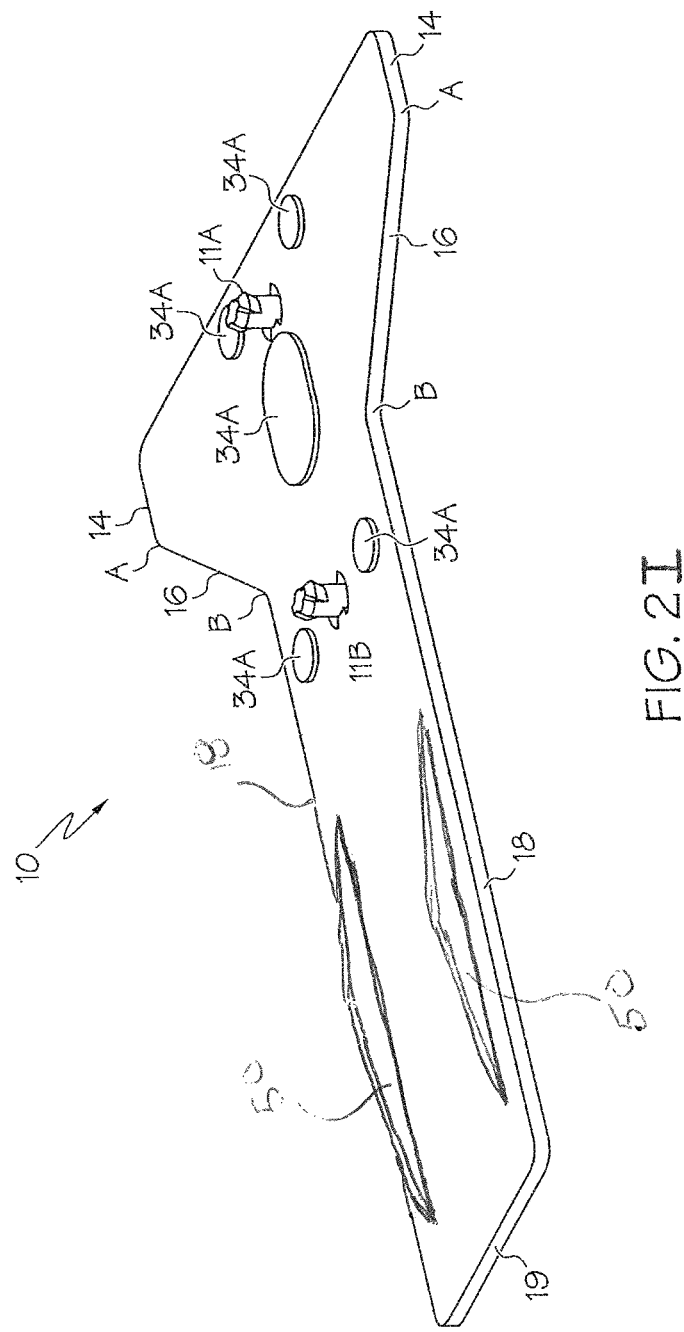
FIG. 2I is a bottom view of a clip of the mounting unit of FIGS. 1A-1C in accordance with embodiments of the present inventive concepts.

FIG. 2I is a bottom view of a clip of the mounting unit of FIGS. 1A-1C in accordance with embodiments of the present inventive concepts. FIG. 2I is substantially the same as FIG. 2G, except that the clip 10 includes ribs 50 extending along a bottom surface of the clip 10. The ribs 50 provide structural integrity to the clip 10. The ribs 50 may be placed at any position along the clip 10 that does not interfere with the clipping of the clip 10 to the head 20. The ribs may extend along sides of the clip 10, may extend along a middle portion of the clip 10, or may extend from a middle portion of the clip 10 to an edge of the clip.

Figure 3:
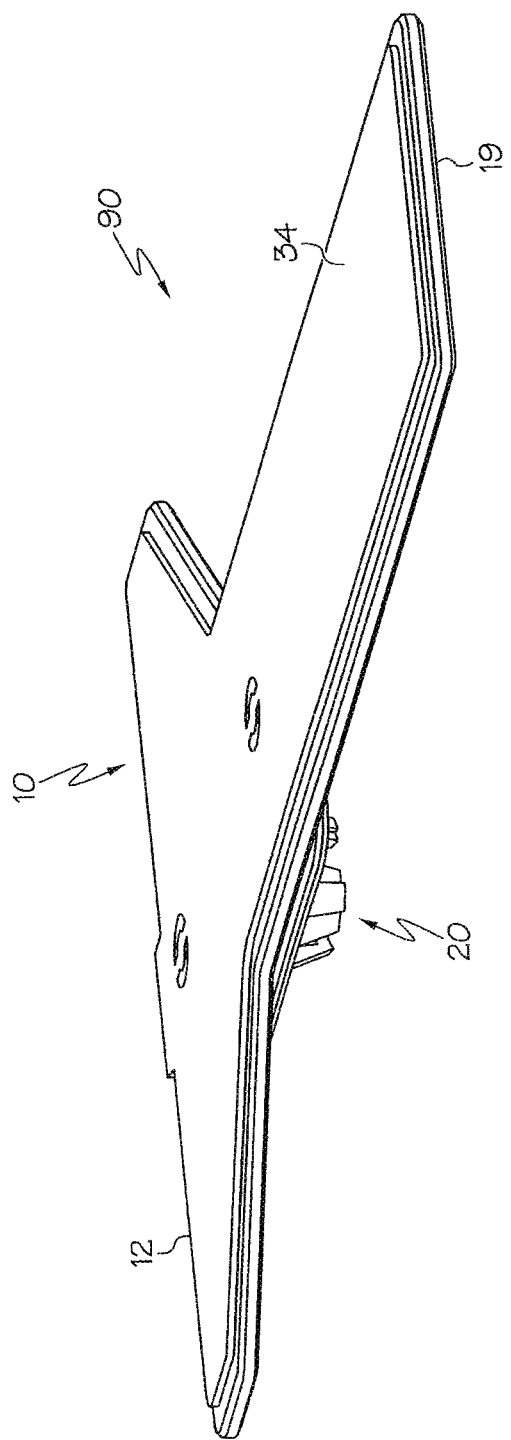
FIG. 3 is a perspective, top view of the mounting unit of FIGS. 1A-1C in accordance with embodiments of the present inventive concepts.
Figure 4:
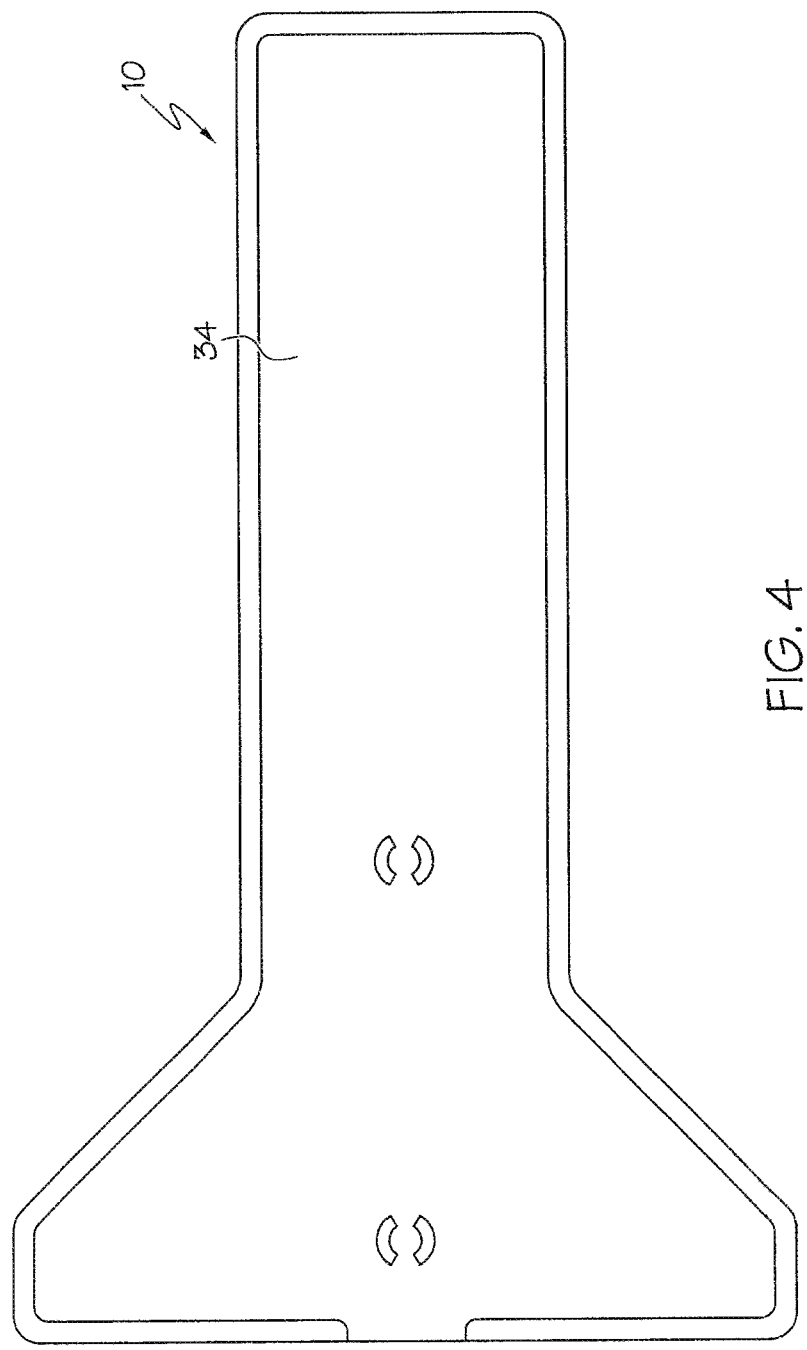
FIG. 4 is a top view of the mounting unit of FIGS. 1A-1C in accordance with embodiments of the present inventive concepts.

FIG. 3 is a perspective, top view of the mounting unit 90 of FIGS. 1A-1C in accordance with embodiments of the present inventive concepts. FIG. 4 is a top view of the mounting unit 90 of FIGS. 1A-1C in accordance with embodiments of the present inventive concepts.

As illustrated in FIG. 3, in some embodiments, the clip 10 may include a high-friction-material surface pad 34, or multiple pads, at an upper surface thereof. The surface pad 34 operates as a point-of-contact for the partition mount system with an abutting mounting surface, such as a ceiling of a room, or with the wall channel 94A, intermediate channel 94B or tile 93 of a drop ceiling system. In this manner, the surface pad 34 provides a high-friction interface between the partition mount system and the abutting mounting surface to reduce the likelihood of the installed partition mount system slipping relative to the abutting mounting surface. In some embodiments, the surface pad 34 is formed of a resilient, compressible, high-friction material, for example, rubber, foam, silicone-based material, or the like.

FIG. 5 is a perspective view of the mounting unit 90 of FIGS. 1A-1C coupled to an elongated adjustable-length pole and positioned between a drop ceiling and a floor in accordance with embodiments of the present inventive concepts. FIGS. 6, 7, 8 and 9 are perspective views of the mounting unit 90 of FIGS. 1A-1C coupled to an elongated adjustable-length pole in accordance with embodiments of the present inventive concepts.

As illustrated in FIG. 5, the first edge 12 of the clip 10 and the first end 22 of the head 20 are positioned along the ceiling at a portion of the ceiling that intersects with the wall. The T-shaped clip 10 is positioned extending along the grid of the drop ceiling along the wall and extending along the grid that extends substantially perpendicular to the wall.

The socket 28 of the head 20 mates with a pivot joint 100 at an end of the elongated adjustable-length pole 110 which permits pivot of the mounting unit 90 relative to the elongated adjustable-length pole 110.

FIGS. 6, 7, 8 and 9 are perspective views of the mounting unit of FIGS. 1A-1C coupled to an elongated adjustable-length pole in accordance with embodiments of the present inventive concepts.

Figure 6:
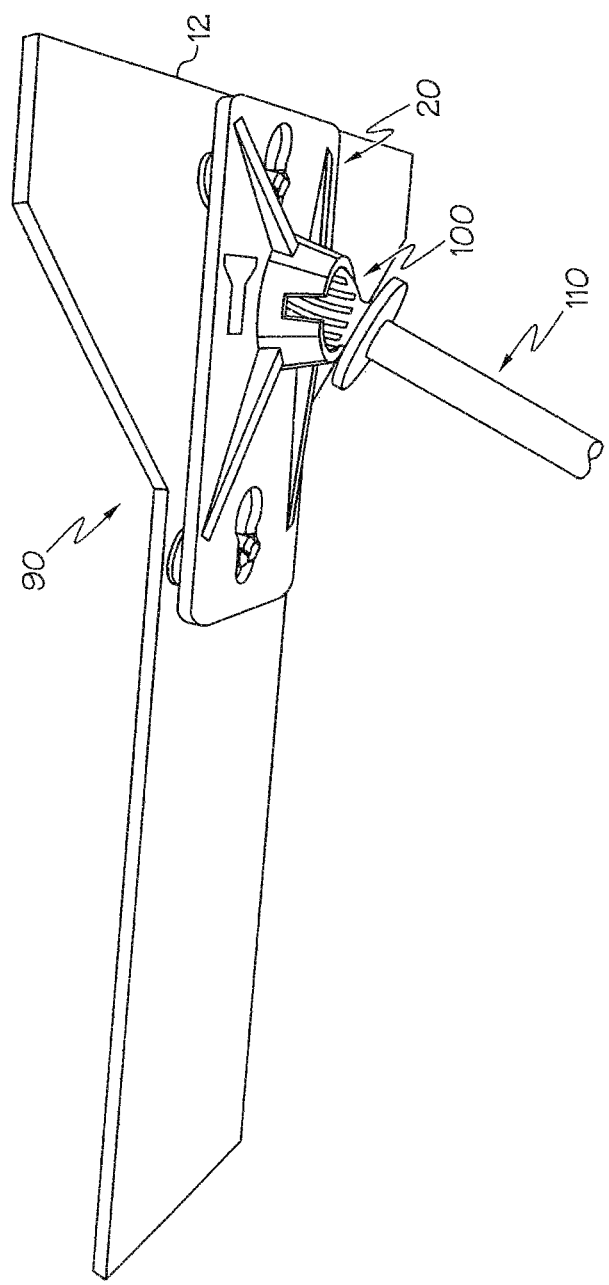
FIGS. 6, 7, 8 and 9 are perspective views of the mounting unit of FIGS. 1A-1C coupled to an elongated adjustable-length pole in accordance with embodiments of the present inventive concepts.
Figure 7:
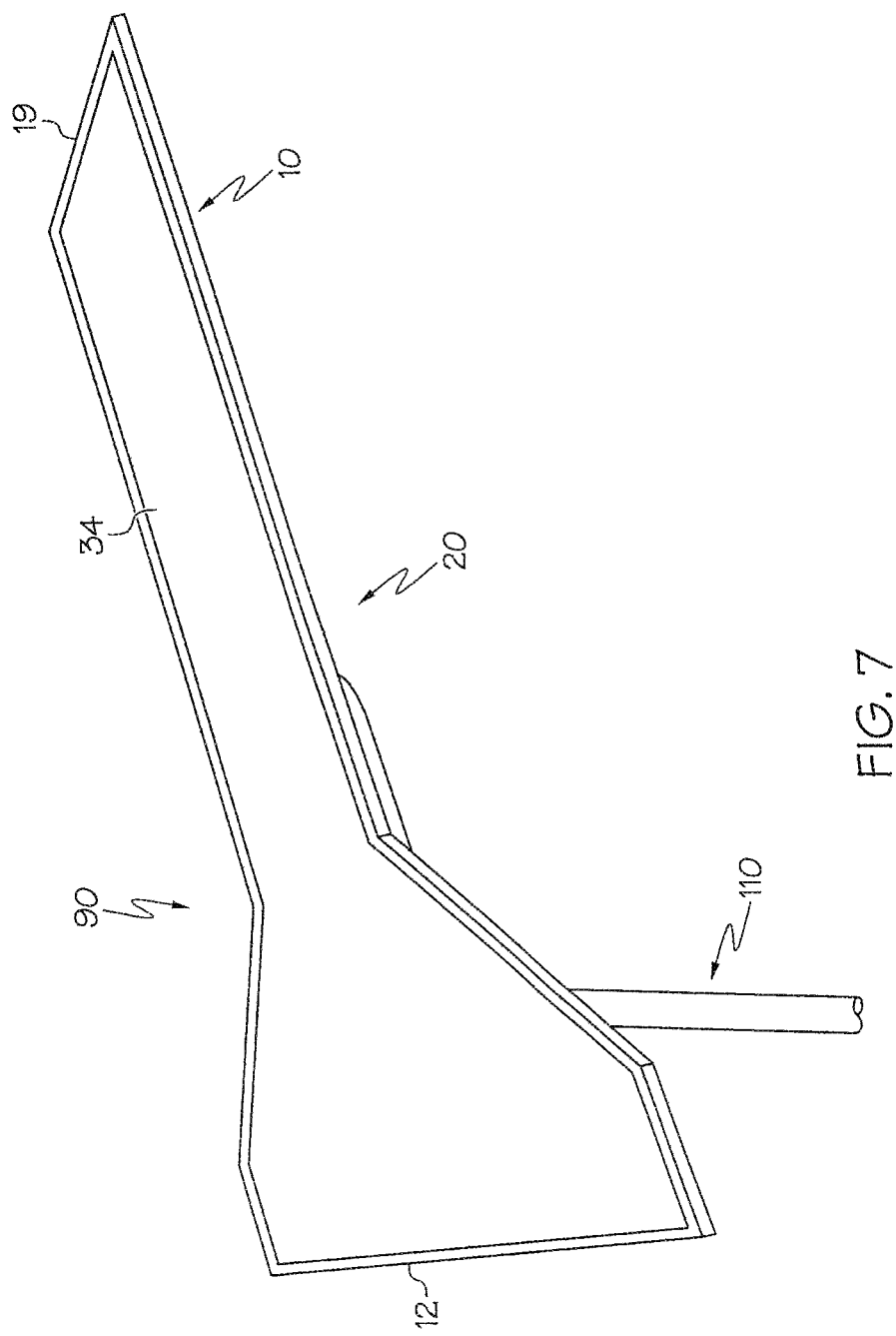

FIG. 6 is a bottom view of the mounting unit 90 and FIG. 7 is a top view of the mounting unit 90. As illustrated in FIGS. 6 and 7, the universal ball and socket joint 28 permits the adjustable-length pole 110, or a plunger of an adjustable-length pole to be oriented at a range of angles relative to the mounting unit 90. The adjustable-length pole 110 or a rod extending from the adjustable-length pole 110 may be spring-loaded. For example the adjustable-length pole 110 may be an adjustable-length pole as described in connection with U.S. Pat. No. 7,658,219, which is incorporated herein by reference.

Figure 8:
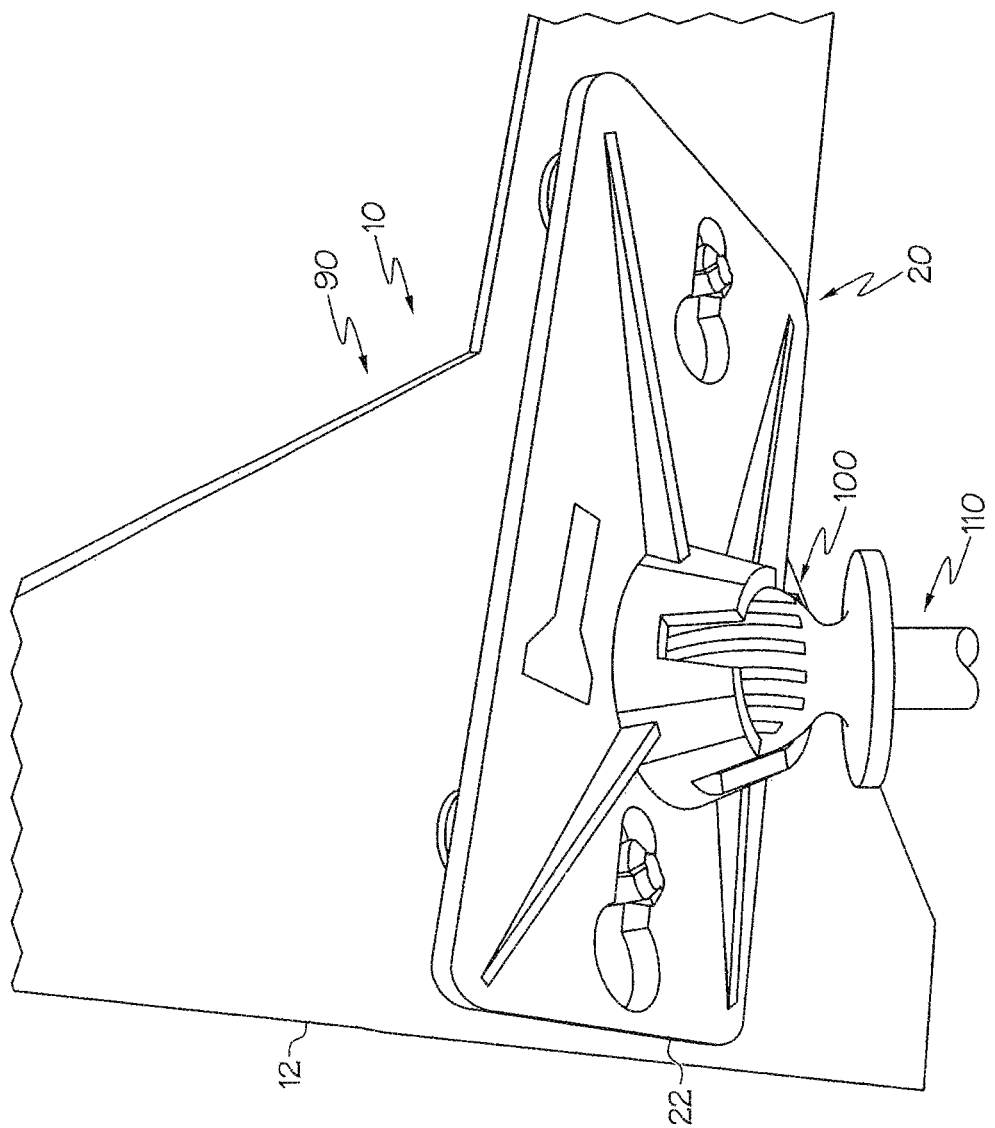
Figure 9:
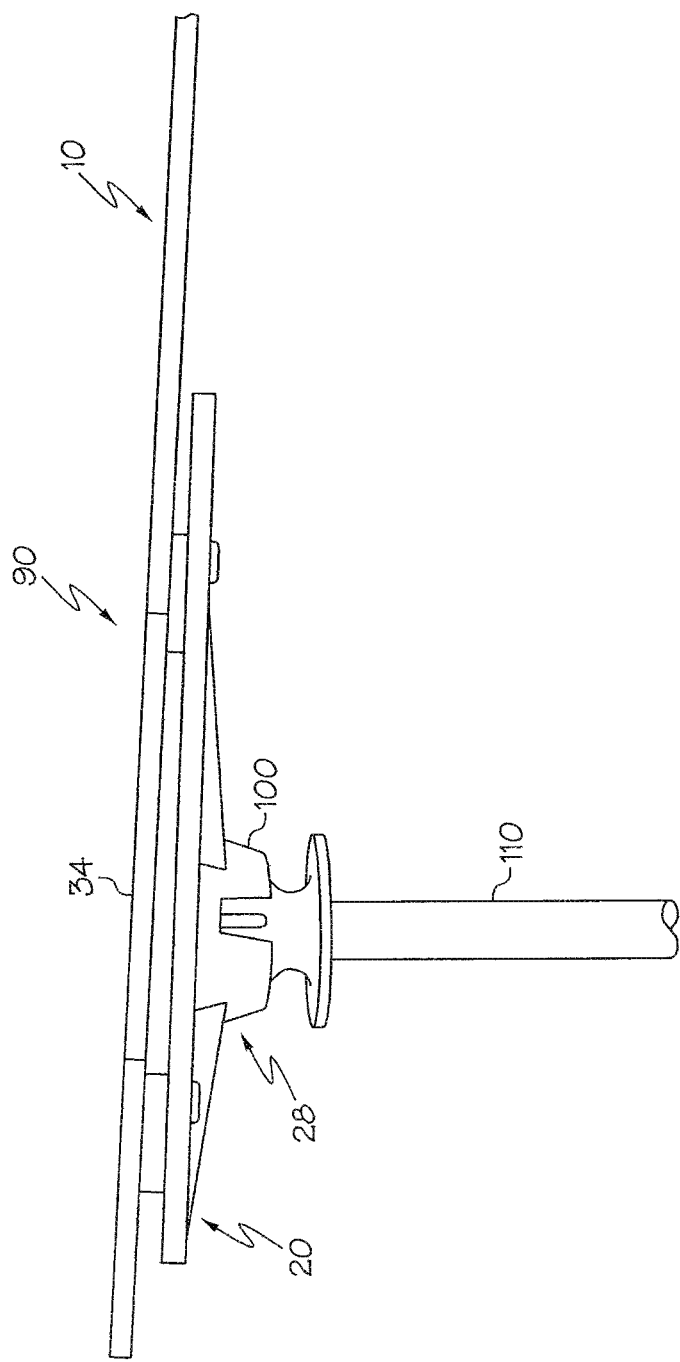

FIG. 8 is a bottom view of the mounting unit 90 and the adjustable-length pole 110. FIG. 9 is a side view of the mounting unit 90 and the adjustable-length pole 110. FIGS. 8 and 9 illustrate the mating of the clip 10 and head 20 with the high-friction-material surface pads 34A between the clip 10 and the head 20. The pins 11A, 11B of the clip 10 extend through the apertures 30A and 30B of the head 20.

Figure 11:
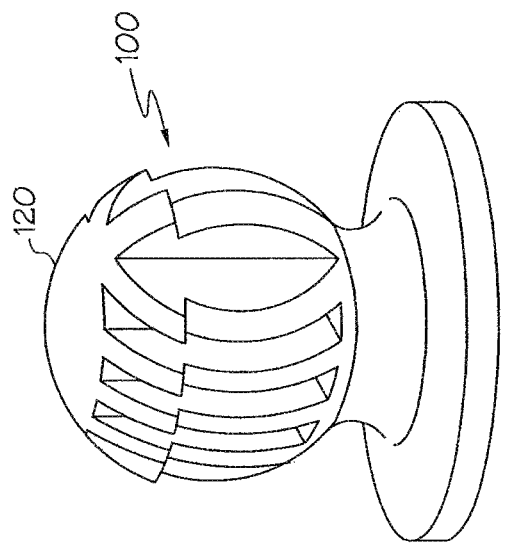
FIGS. 10 and 11 is a perspective view of a pivot joint of an elongated adjustable-length pole in accordance with embodiments of the present inventive concepts.
Figure 10:
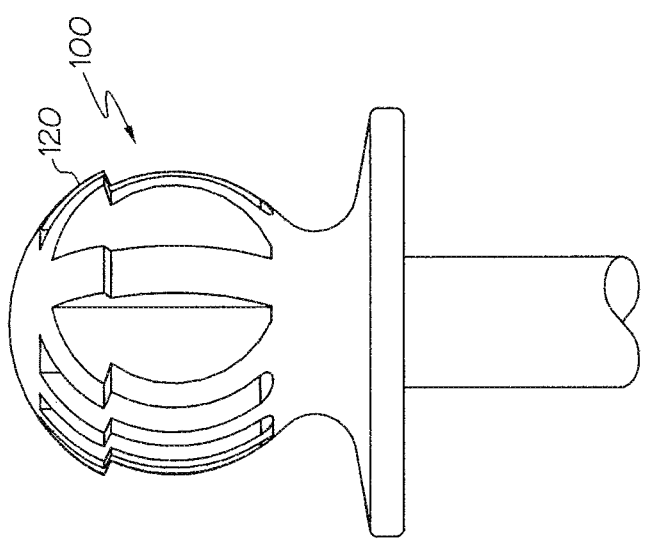
Figure 12B:
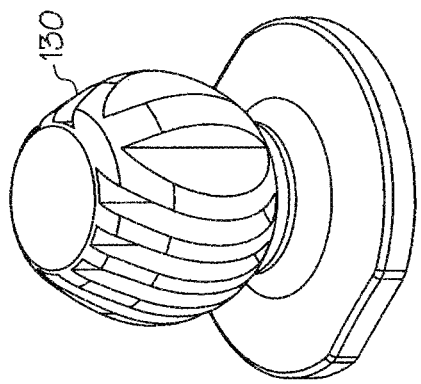
FIGS. 12A-12D are perspective views of a pivot joint of an elongated adjustable-length pole in accordance with embodiments of the present inventive concepts.
Figure 12D:
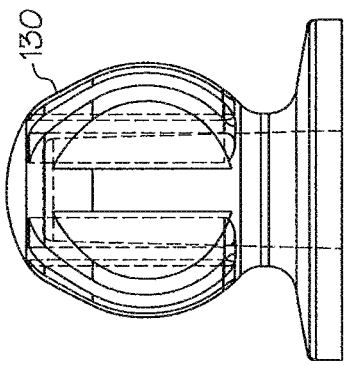
Figure 12A:
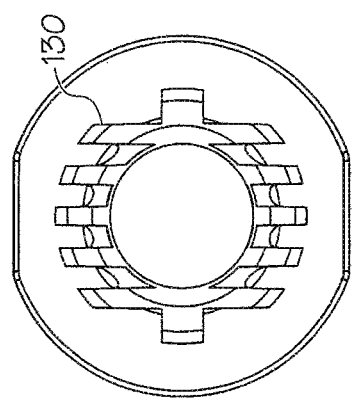
Figure 12C:
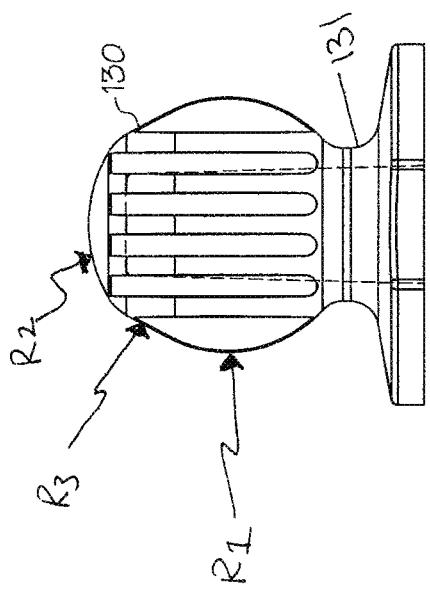

FIGS. 10 and 11 are perspective views of a ball of a pivot joint 100 of an elongated adjustable-length pole that interacts with a socket of the pivot joint of the head in accordance with conventional embodiments. In FIGS. 10 and 11, the ball of the pivot joint 100 includes a hat portion 120. The hat portion 120 is an upper portion of the ball of the pivot joint 100 and extends out beyond a lower portion of the pivot joint 100. The hat portion 120 prevents the mounting unit 90 from over rotating relative to the adjustable-length pole 110. The hat portion 120 may become worn and/or damaged over time and may, therefore, lead to inadvertent detachment of the pivot joint.

FIGS. 12A-12D are perspective views of a ball of a pivot joint 130 of an elongated adjustable-length pole in accordance with embodiments of the present inventive concepts. The pivot joint ball 130 offers increased resistance to long-term wear or damage. The pivot joint ball 130 has an ovoid shape or egg-shape such that the bottom portion of the pivot joint ball 130 is wider than the top portion. The pivot joint 130 having the egg-shape prevents the mounting unit 90 from over rotating relative to the adjustable-length pole 110.

The pivot joint has a first bottom portion having a first radius R1 and a top portion having a second radius R2 larger than the first radius R1. The top portion of the pivot joint 130 is tapered toward the bottom portion of the pivot joint 130 such that the tapered portion has a third radius R3 larger than the first radius R1 and the second radius R2.

The shape of the pivot joint ball 130 is such that when it interacts with the socket, the teeth of the socket retain the ball 130 of the pivot joint throughout its range of pivot. At a greatest angle of pivot, the teeth of the socket abut the underside of the ball 130 in the vicinity of the neck 131 on one side of the ball 130. At the same time, the top portion of the ball 130, being ovoid in shape, extends into the socket, such that the teeth of the socket abut the tapered portion of the ball 130 on the opposite side of the ball 130, thereby retaining the top portion within the socket. In this manner, the ball of the pivot joint 130 is retained by the teeth of the socket throughout its range of motion. In comparison, if the ball 130 were spherical in shape, it would more readily be released from the socket when positioned at its greatest pivot angle. Due to the elongated shape of the ball 130 and the tapered sides, the ball extends further into the socket than a ball which is spherical in shape. In some embodiments, the ball is in a press-fit relationship with the socket, so that the teeth of the socket flex to receive the ball when inserted and so that the teeth of the socket flex to release the ball when pulled from the socket. In particular, in this embodiment, the ball is more easily removed from the socket in a vertical orientation, rather than being removed by twisting the ball relative to the socket at its greatest pivot angle. The ovoid shape of the ball mitigates wear of the ball and socket over time, since the walls of the ovoid-shaped ball are relatively smooth or continuous. The pivot joint 130 of FIGS. 12A-12D may be pulled out of the socket without becoming worn and/or damaged over time.

While the present inventive concepts have been particularly shown and described above with reference to example embodiments thereof, it will be understood by those of ordinary skill in the art, that various changes in form and detail can be made without departing from the spirit and scope of the present inventive concepts described and defined by the following claims.

What is claimed is:

1. A mount system comprising:
    a mounting unit that removably secures a sheet of material comprising:
        a first portion having a socket on a lower surface thereof; and
        a second portion configured to mate with the first portion;
        wherein the first portion and second portion are configured to secure a sheet of material therebetween;
    an elongated adjustable-length pole having a foot end and a head end, the elongated adjustable-length pole being adjustable in length between the foot end and the head end and has a longitudinal axis; and
    a pivot joint ball at the head end of the elongated adjustable-length pole configured to mate with the socket, the pivot joint ball having an ovoid shape such that a bottom portion of the pivot joint ball is wider than a top portion of the pivot joint ball, the top portion of the pivot joint ball being rounded,
    wherein the pivot joint ball comprises:
    a bottom portion having a first radius of curvature;
    a top portion having a second radius of curvature larger than the first radius of curvature;
    wherein the top portion is tapered toward the bottom portion such that the tapered portion has a third radius of curvature larger than the first radius of curvature and the second radius of curvature; and
    wherein walls of the pivot joint ball are continuous from the bottom portion to a center of the top portion.

2. The mount system of claim 1, wherein the socket includes elastically deformable teeth configured to expand around the pivot joint ball, when the pivot joint ball is inserted into the socket, to provide a snap-fit relationship.

3. The mount system of claim 2, wherein teeth of the socket retain the pivot joint ball throughout its range of pivot.

4. The mount system of claim 2, wherein the pivot joint ball is in a press-fit relationship with the socket such that the teeth of the socket are configured to flex to receive the pivot joint ball when the pivot joint ball is inserted in the socket, and the teeth of the socket are configured to release the ball when pulled from the socket.

5. The mount system of claim 1, wherein the mounting unit further comprises:
    the first portion having a first end and a second end opposite the first end; and
    the second portion having a first end and a second end opposite the first end, the first end of the second portion being wider than the second end of the second portion, the first end of the second portion having a width greater than a width of the first portion in a first horizontal direction and the second portion having a length greater than a length of the first portion in a second horizontal direction orthogonal to the first horizontal direction;

wherein the first portion and second portion are separable from each other and configured to secure a sheet of material therebetween, and wherein the first end of the first portion has the same width as the second end of the first portion.

6. The mount system of claim 5, wherein the second portion is T-shaped.

7. The mount system of claim 5, wherein the socket is positioned a first distance from the first end of the first portion and a second distance from the second end of the first portion, and wherein the second distance is greater than the first distance.

8. The mount system of claim 5, wherein the socket is closer to the first end of the first portion than to the second end of the first portion.

9. The mount system of claim 5, wherein the second portion includes at least one pin and wherein the first portion includes at least one aperture that receives the at least one pin.

10. The mount system of claim 9, wherein the at least one pin and the at least one aperture mate in a snap-fit relationship to secure the first and second portions together.

11. The mount system of claim 9, wherein at least one pin comprises first and second pins, wherein the first pin is spaced apart from the first end of the second portion a first distance and the second pin is spaced apart from the first end of the second portion a second distance which is greater than the first distance, and wherein the first and second pins are positioned along the second portion closer to the first end of the second portion than to the second end of the second portion.

12. The mount system of of claim 9, wherein the at least one aperture comprises a keyhole and slot, and wherein the mating at least one pin comprises a retaining knob, and wherein the first portion and second portion are secured by inserting each pin in a mating keyhole and sliding the pin from the keyhole and into the slot where the pin is retained in the aperture by the retaining knob.

13. The mount system of mounting unit of claim 1 further comprising a high-friction material applied to an upper surface of the second portion.

14. The mount system of mounting unit of claim 1 further comprising a high-friction material coupled to at least one of the first portion and the second portion at a position where the first portion and the second portion interface.

15. The mount system of mounting unit of claim 1, wherein the first portion is rectangular shaped and the second portion is T-shaped.

16. The mount system of mounting unit of claim 1, wherein walls of the pivot joint ball extend in a vertical direction from the bottom portion to a center of the top portion.

* * * * *